US010815050B2

(12) United States Patent
Hess et al.

(10) Patent No.: US 10,815,050 B2
(45) Date of Patent: Oct. 27, 2020

(54) MODULAR MATERIAL DELIVERY SYSTEM AND METHOD FOR SETUP

(71) Applicant: Can Do Logistics LLC, Berlin, WI (US)

(72) Inventors: Michael C. Hess, Berlin, WI (US); Preston M. Hess, Berlin, WI (US)

(73) Assignee: Can Do Logistics LLC, Berlin, WI (US)

(*) Notice: Subject to any disclaimer, the term of this patent is extended or adjusted under 35 U.S.C. 154(b) by 286 days.

(21) Appl. No.: 16/153,126

(22) Filed: Oct. 5, 2018

(65) Prior Publication Data

US 2019/0106273 A1    Apr. 11, 2019

Related U.S. Application Data

(60) Provisional application No. 62/568,566, filed on Oct. 5, 2017, provisional application No. 62/624,893, filed
(Continued)

(51) Int. Cl.
| | |
|---|---|
| *B65D 88/28* | (2006.01) |
| *B65D 88/32* | (2006.01) |
| *B01F 15/02* | (2006.01) |
| *B01F 13/10* | (2006.01) |
| *B65G 11/18* | (2006.01) |

(Continued)

(52) U.S. Cl.
CPC .......... *B65D 88/28* (2013.01); *B01F 13/1005* (2013.01); *B01F 15/0235* (2013.01); *B65D 88/32* (2013.01); *B65G 11/186* (2013.01); *B65G 2201/04* (2013.01); *B65G 2814/0319* (2013.01); *E04G 1/362* (2013.01); *F16M 1/00* (2013.01)

(58) Field of Classification Search
CPC ......... B65D 88/28; B65D 88/30; B65D 88/32
See application file for complete search history.

(56) References Cited

U.S. PATENT DOCUMENTS

2013/0206415 A1* 8/2013 Sheesley ............... B65G 65/00
                                                              166/308.1
2014/0305769 A1  10/2014 Eiden et al.
(Continued)

FOREIGN PATENT DOCUMENTS

DE            4217329        5/1993

OTHER PUBLICATIONS

International Search Report and Written Opinion dated Jan. 4, 2019.
(Continued)

*Primary Examiner* — Jonathan Snelting
(74) *Attorney, Agent, or Firm* — Christopher M. Scherer; DeWitt LLP

(57) ABSTRACT

The present invention is a modular system for delivering material directly to a blender hopper. The system includes primary base and optional secondary base modules supporting surge hoppers which receive material from material containers. The surge hopper may then dispense the material directly and rapidly to the blender hopper by gravity feed. During continuous operation, exhausted material containers may be removed from the surge hoppers and replaced with full material containers as material empties from the surge hoppers. This allows steady, high-volume flow of material to the blender hopper.

22 Claims, 30 Drawing Sheets

Related U.S. Application Data on Feb. 1, 2018, provisional application No. 62/642,738, filed on Mar. 14, 2018.

(51) Int. Cl.
*E04G 1/36* (2006.01)
*F16M 1/00* (2006.01)

(56) References Cited

U.S. PATENT DOCUMENTS

| | | |
|---|---|---|
| 2015/0284194 A1 | 10/2015 | Oren et al. |
| 2017/0203915 A1* | 7/2017 | Oren .................. B65G 65/40 |
| 2017/0320660 A1* | 11/2017 | Sanders ............... E21B 43/267 |
| 2019/0127144 A1* | 5/2019 | Lucas .................. B62D 63/06 |

OTHER PUBLICATIONS

International Preliminary Report on Patentability for PCT/2018/054632 dated Apr. 16, 2020.

* cited by examiner

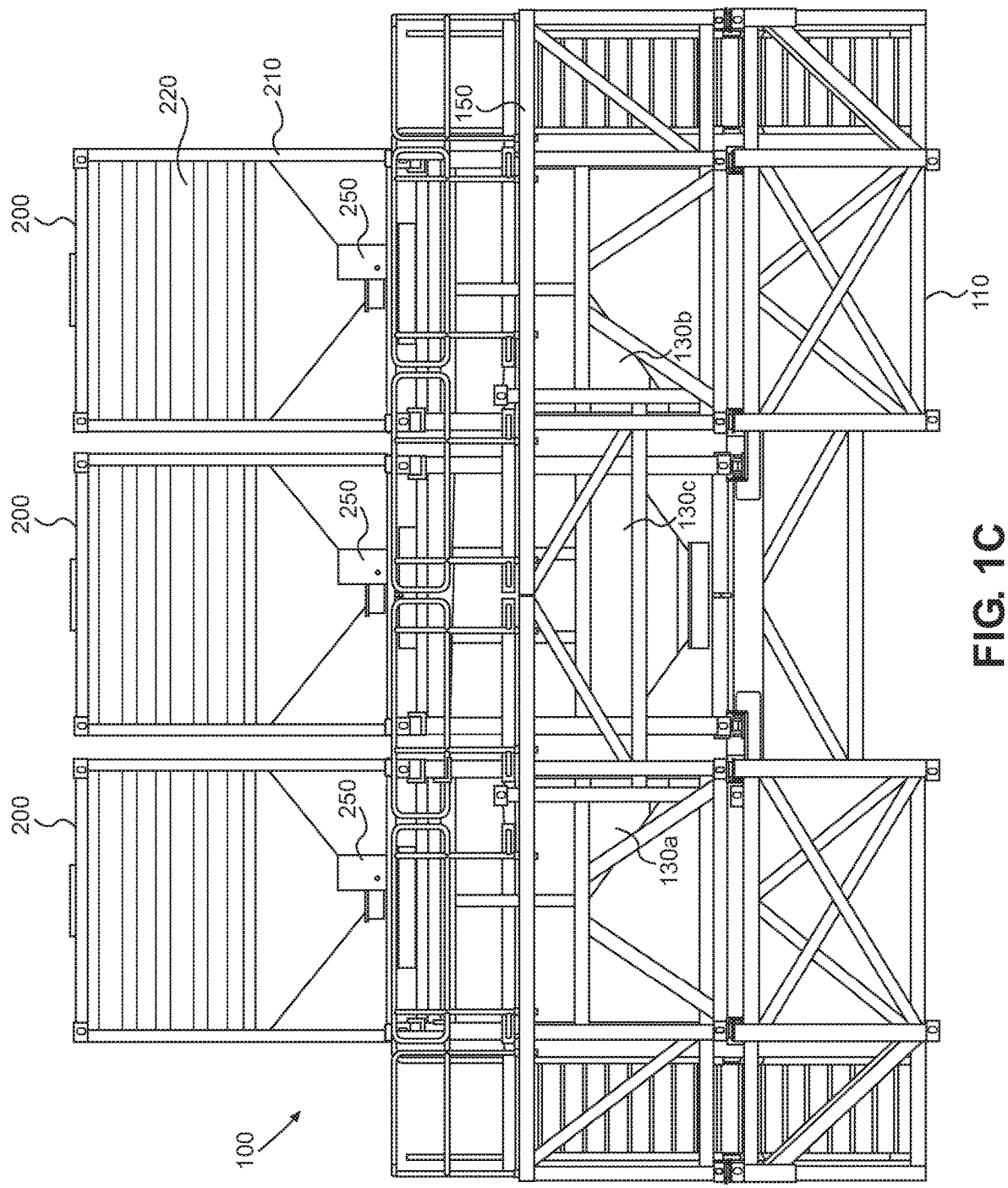

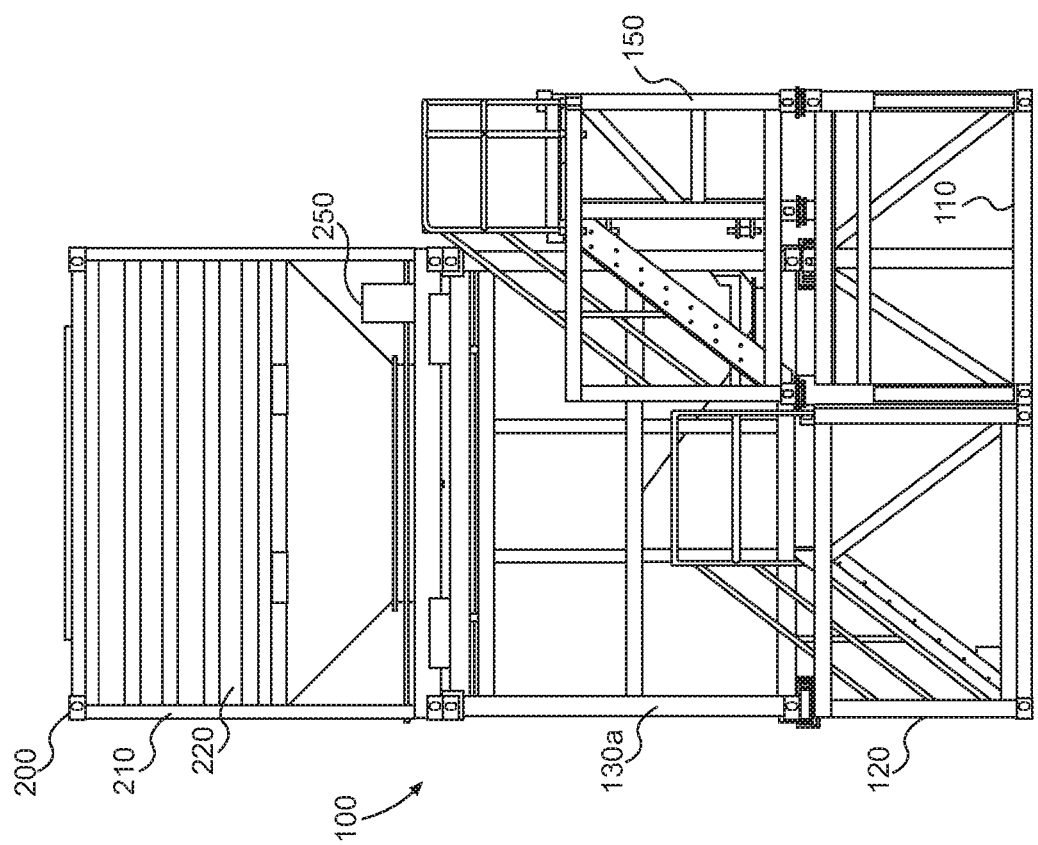
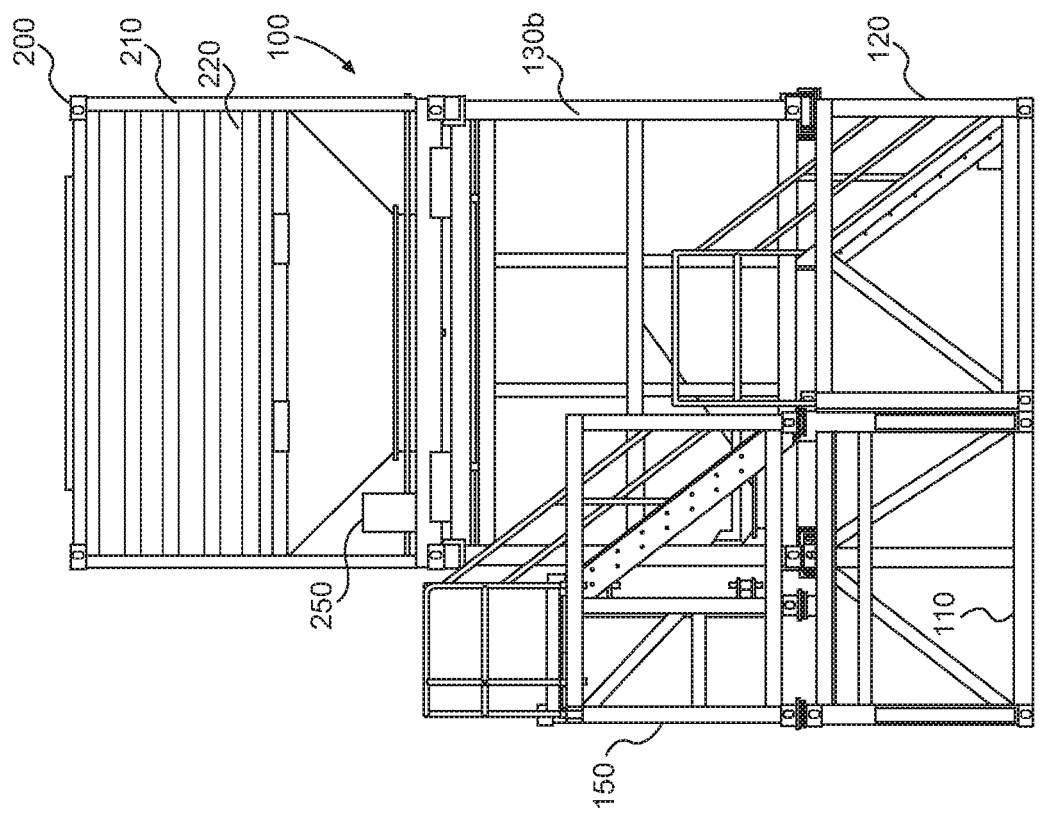

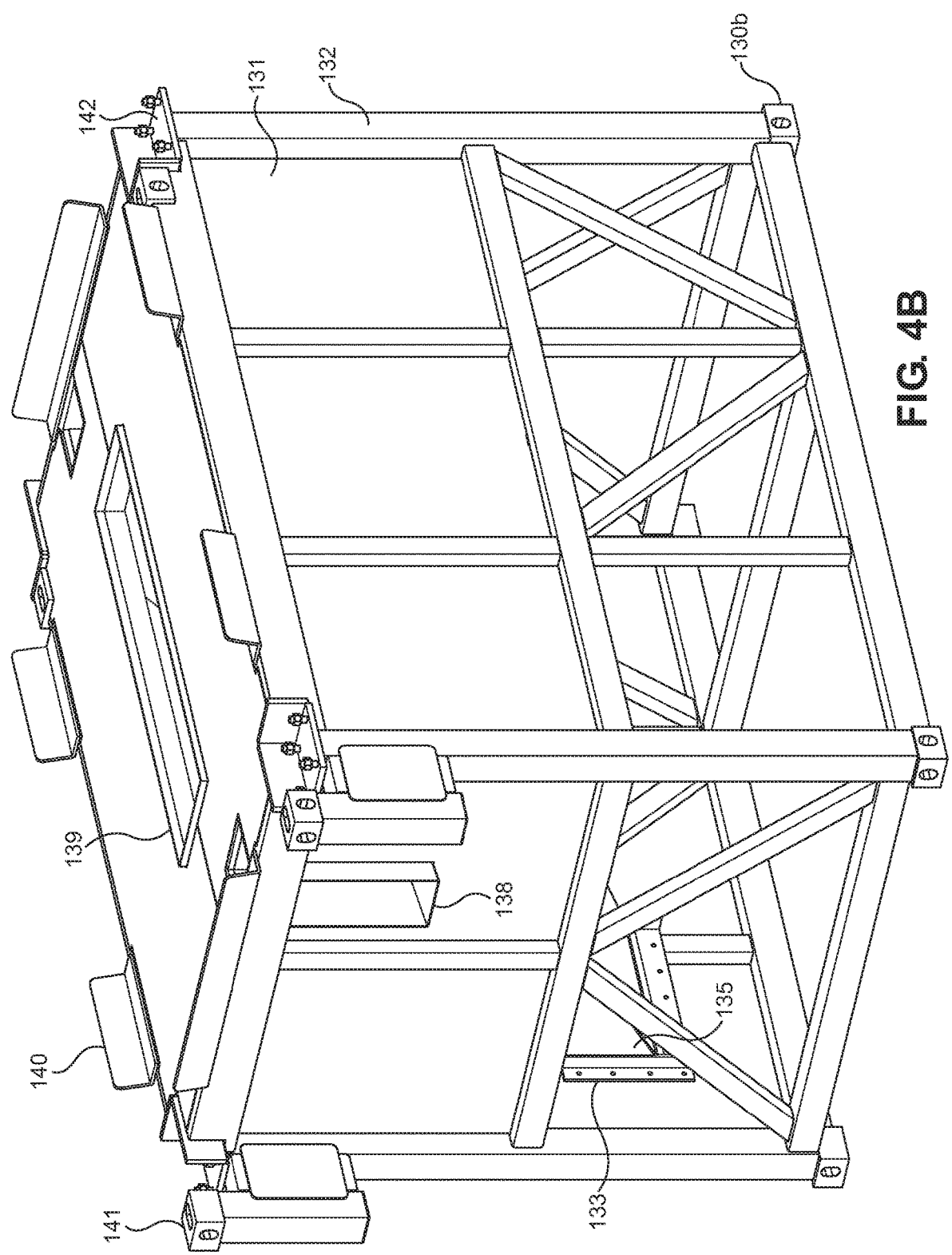

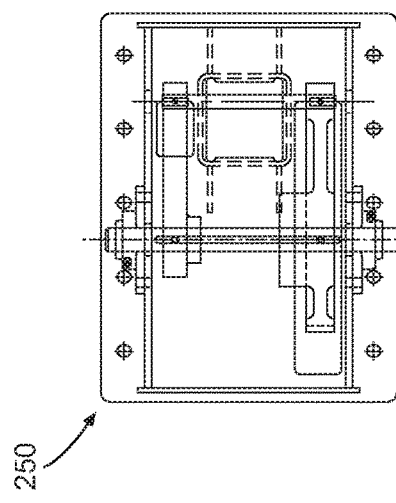
FIG. 7F
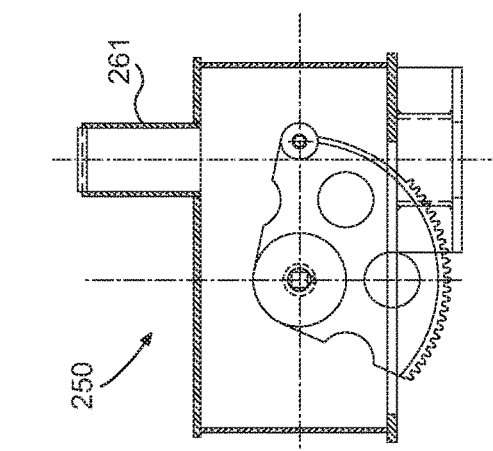
FIG. 7G
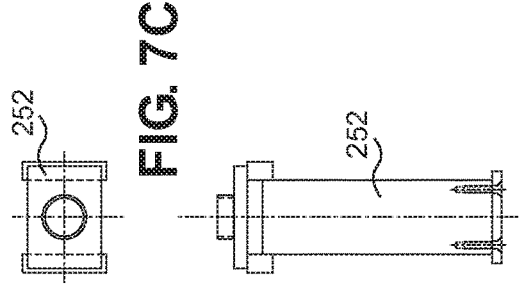
FIG. 7C
FIG. 7D
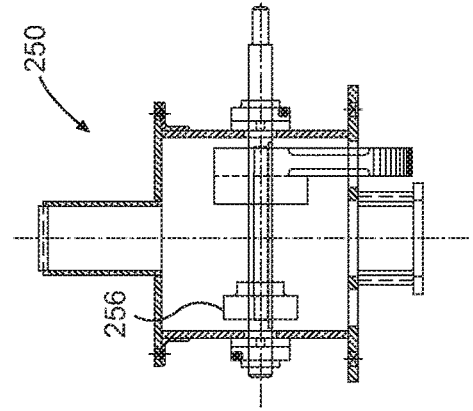
FIG. 7E
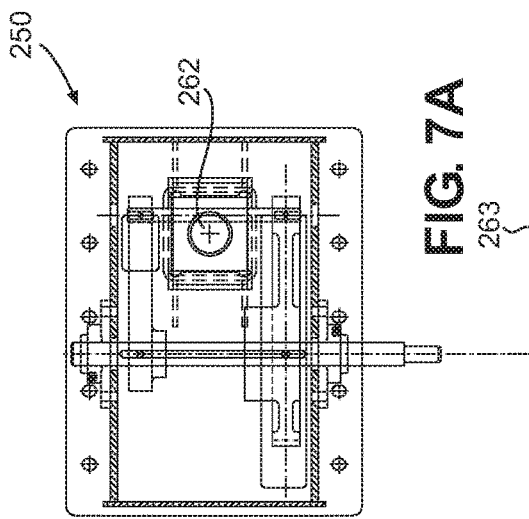
FIG. 7A
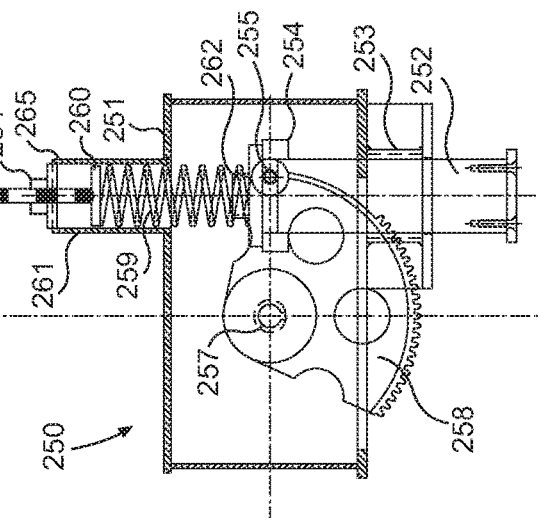
FIG. 7B

MODULAR MATERIAL DELIVERY SYSTEM AND METHOD FOR SETUP

CROSS-REFERENCES TO RELATED APPLICATIONS

This application claims the benefit of prior-filed, U.S. Provisional Patent Application No. 62/568,566, filed on Oct. 5, 2017, U.S. Provisional Patent Application No. 62/624,893, filed on Feb. 1, 2018, and U.S. Provisional Patent Application No. 62/642,738, filed on Mar. 14, 2018, the contents of which are incorporated herein by reference in their entirety.

BACKGROUND OF THE INVENTION

The present application is directed to the field of material handling and material distribution. More specifically, the present application is directed to the field of handling, loading, transporting, unloading, storing and delivering material to a blender hopper at an oil or gas well site.

The oil and gas industry has significantly increased the amount of proppants used to extract oil or gas from a well. With this increase, the industry continues to look for faster proppant delivery methods. A typical system for delivering proppants to an oil or gas well uses a semi-truck and pneumatic trailer or grain type bottom gate trailer which is off loaded to a sand chief, sand king, or some other type of storage vessel for later delivery to the well.

The pneumatic trailer is slow to deliver proppant to a storage vessel, typically at rates of less than 1,600 pounds per minute by way of pneumatic conveyance system. The grain-type bottom gate trailer typically delivers proppant to the storage vessel, typically at a rate of less than 6,000 pounds per minute by way of conveyor system.

With these systems, proppant is typically delivered to the blender hopper by way of conveyor system. Although the storage vessels allow for large volumes of proppant storage on site, the delivery of proppant to the blender hopper is typically less than 10,000 pounds per minute, limited by the constraints of the conveyor systems. Conveyor systems require a large footprint on the work site, increase power consumption, and may eject silica dust and allow loss of proppant. Conveyor systems' complex mechanical structures also increase the likelihood of a breakdown between storage vessels and blender hopper.

The present invention provides an efficient, compact, high-flow means of delivering proppant to the blender hopper.

BRIEF SUMMARY

The present system provides a modular system for delivering material directly to a blender hopper. The system includes a primary base module made up of a primary support frame. The primary support frame including an open frame space on a system front side which at least partially surrounds the blender hopper. The system also includes at least one surge module made up of a surge hopper supported by a surge frame. The surge module is supported by and removably coupled to the primary base module. The surge hopper has a surge discharge gate for discharging material into the blender hopper. The surge module has at least one container actuator for actuating a container gate actuator. The system also includes at least one material container made up of a container vessel supported by a container frame. The at least one material container is supported by and removably coupled to the at least one surge module. The container vessel has a container discharge gate for discharging material into the surge hopper. The container gate actuator is mounted to the container frame.

Another aspect of the present system provides the above modular system with an added secondary base module removably coupled to the primary base module. The secondary base module has a secondary support frame and also supports the surge module.

BRIEF DESCRIPTION OF THE DRAWINGS

FIGS. 1a, 1b, 1c, 1d, 1e, 1f, 1g, and 1h are front perspective, back perspective, front, back, right side, left side, top, and bottom views, respectively, of an aspect of a modular material delivery system.

FIGS. 4a, 4b, and 4c are perspective views of various aspects of surge modules of the modular material delivery system.

FIGS. 7a, 7b, 7c, 7d, 7e, 7f, and 7g are various views of an aspect of a container gate actuator for material containers of the modular material delivery system.

DETAILED DESCRIPTION OF THE INVENTION

Figure 1A:
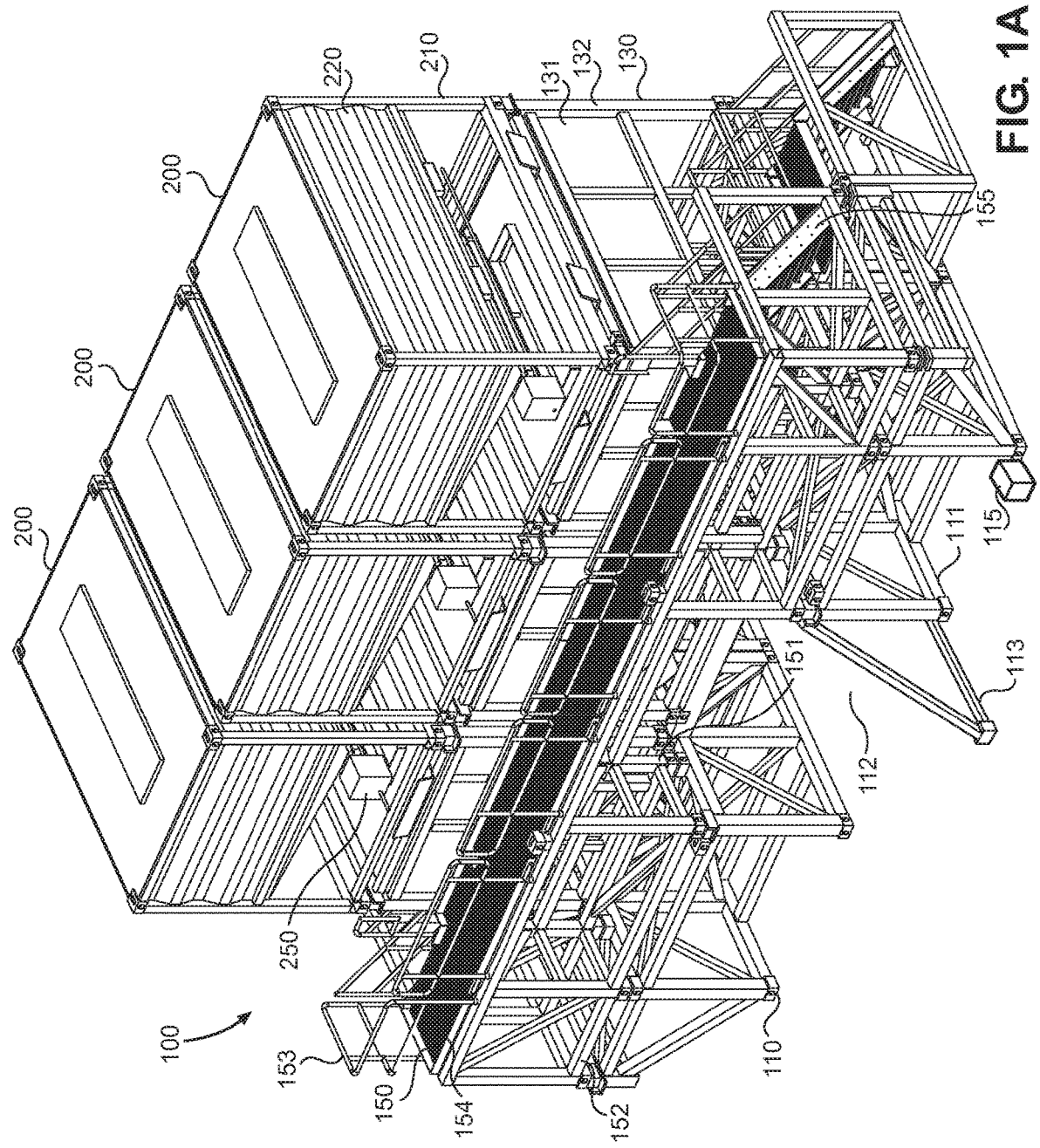
Figure 1B:
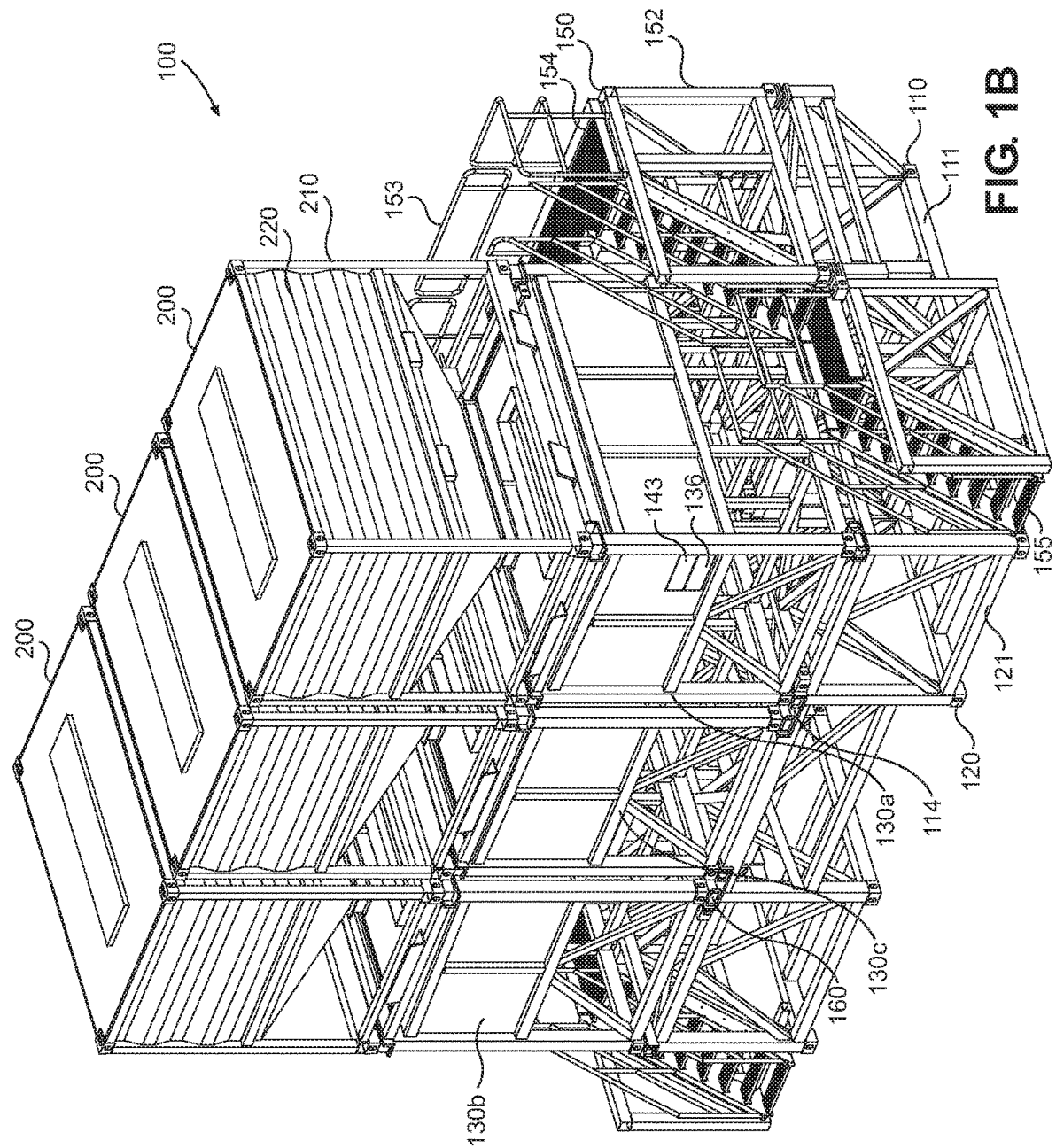
Figure 1D:
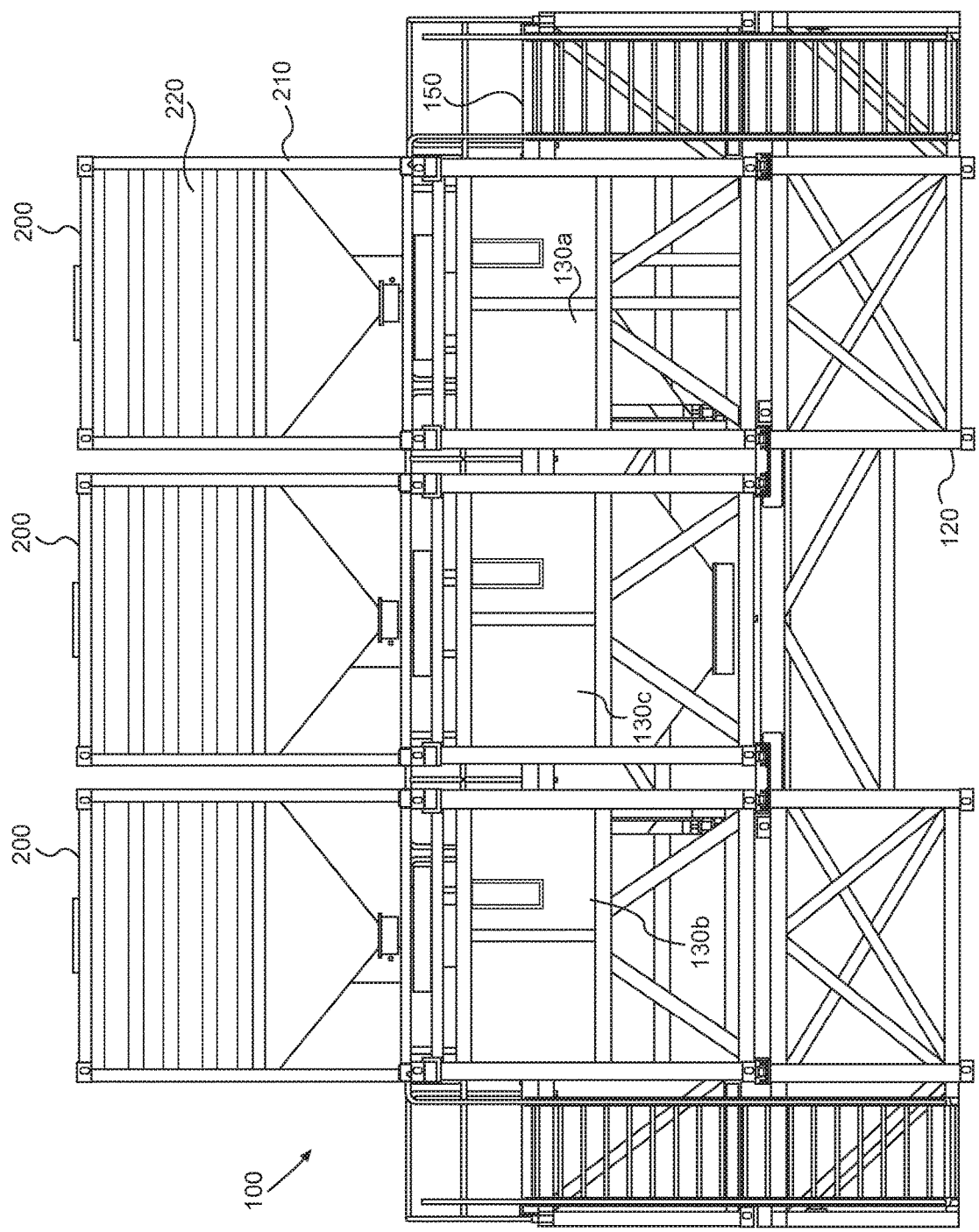
Figure 1G:
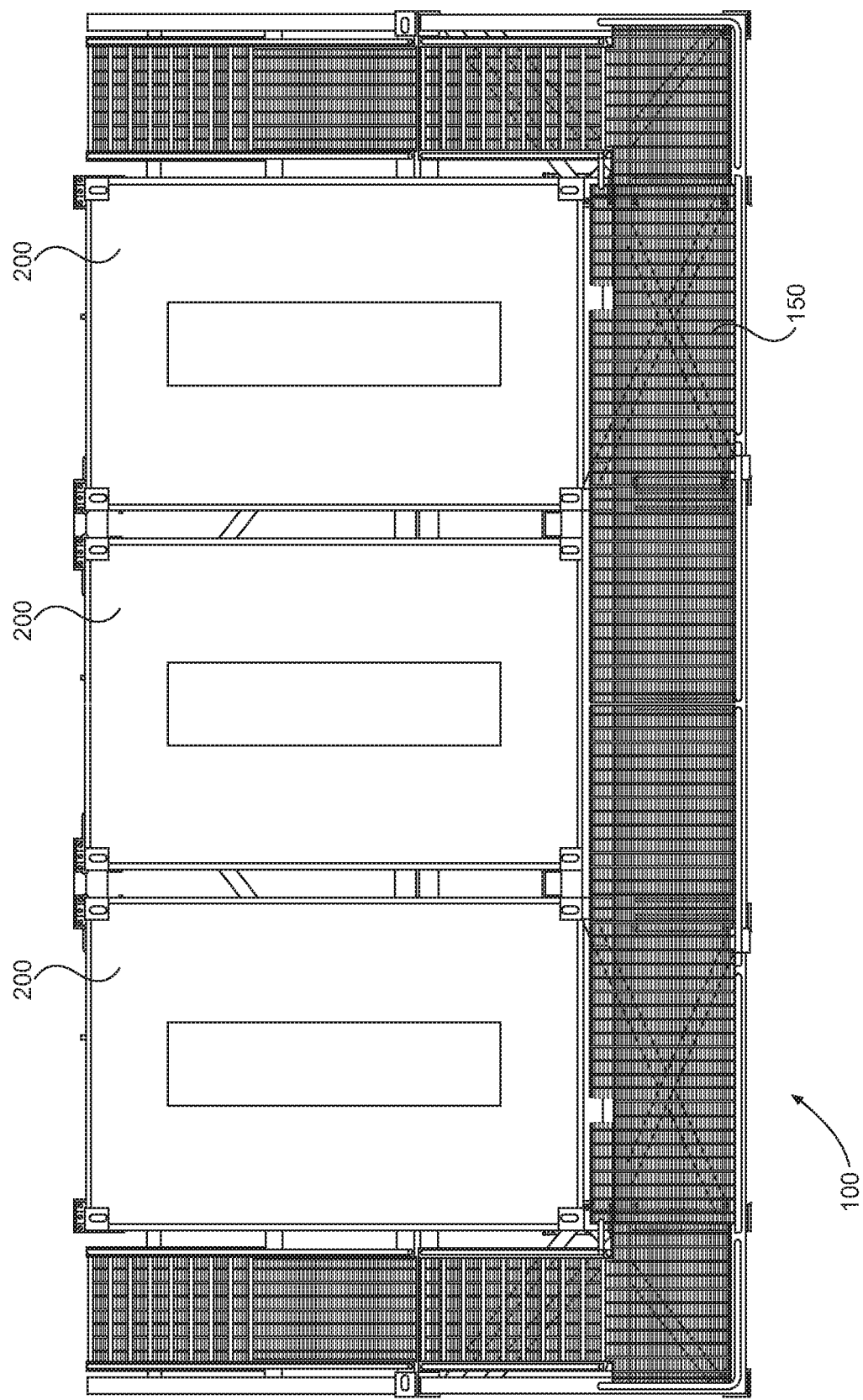
Figure 1H:
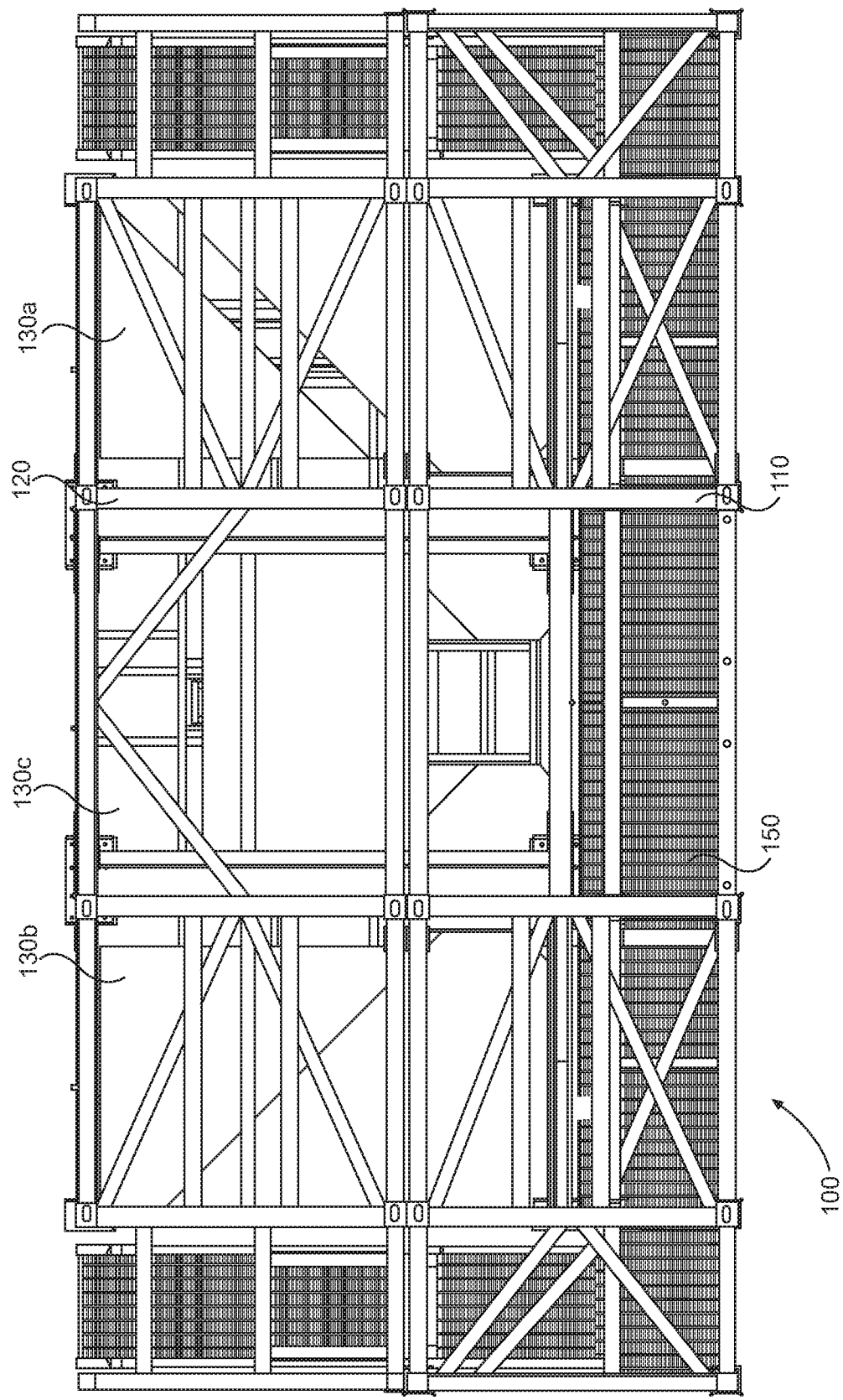
Figure 2A:
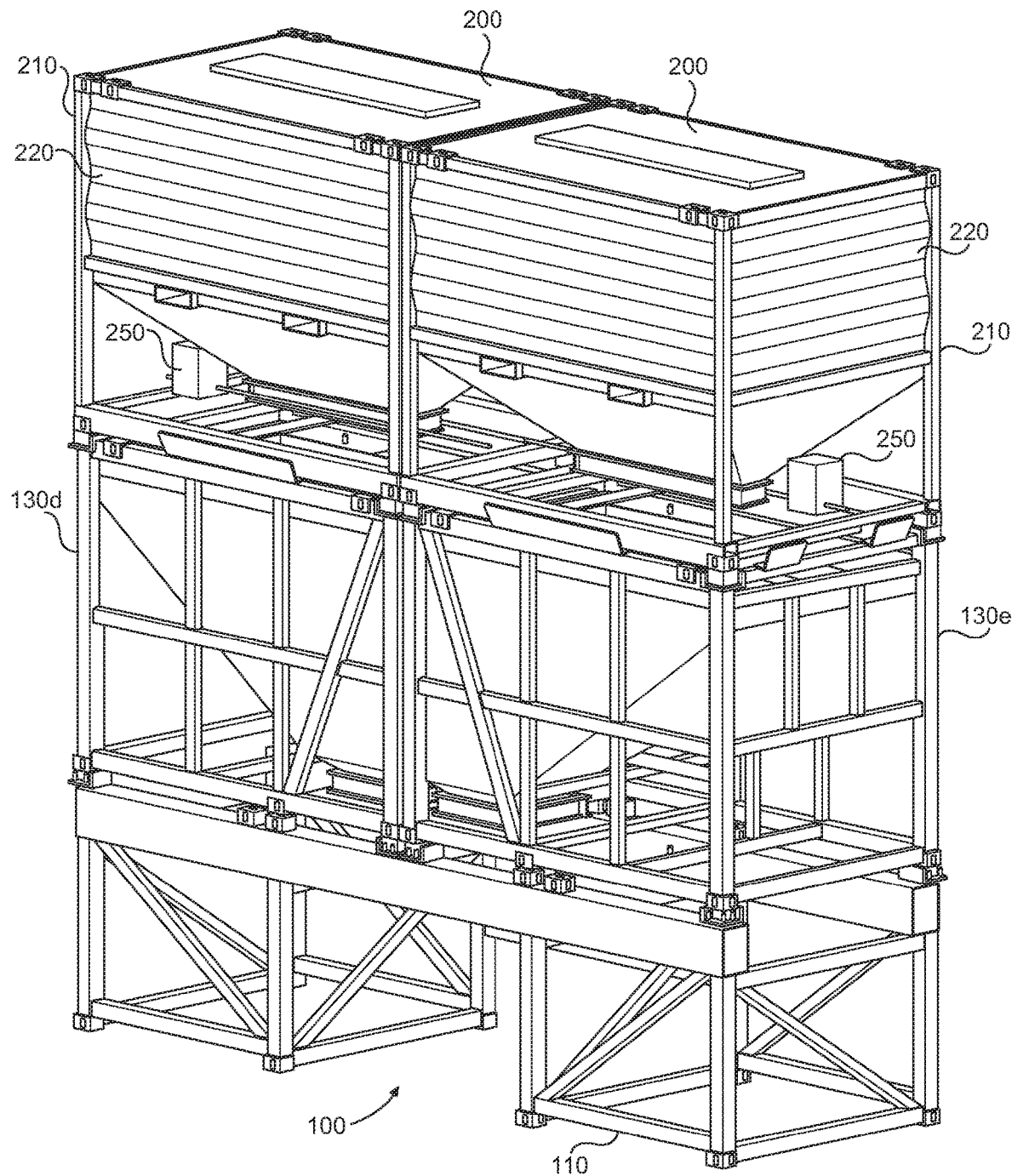
FIGS. 2a, 2b, 2c, 2d, 2e, 2f, and 2g are front perspective, front, back, right side, left side, top, and bottom views, respectively, of another aspect of the modular material delivery system.
Figure 2B:
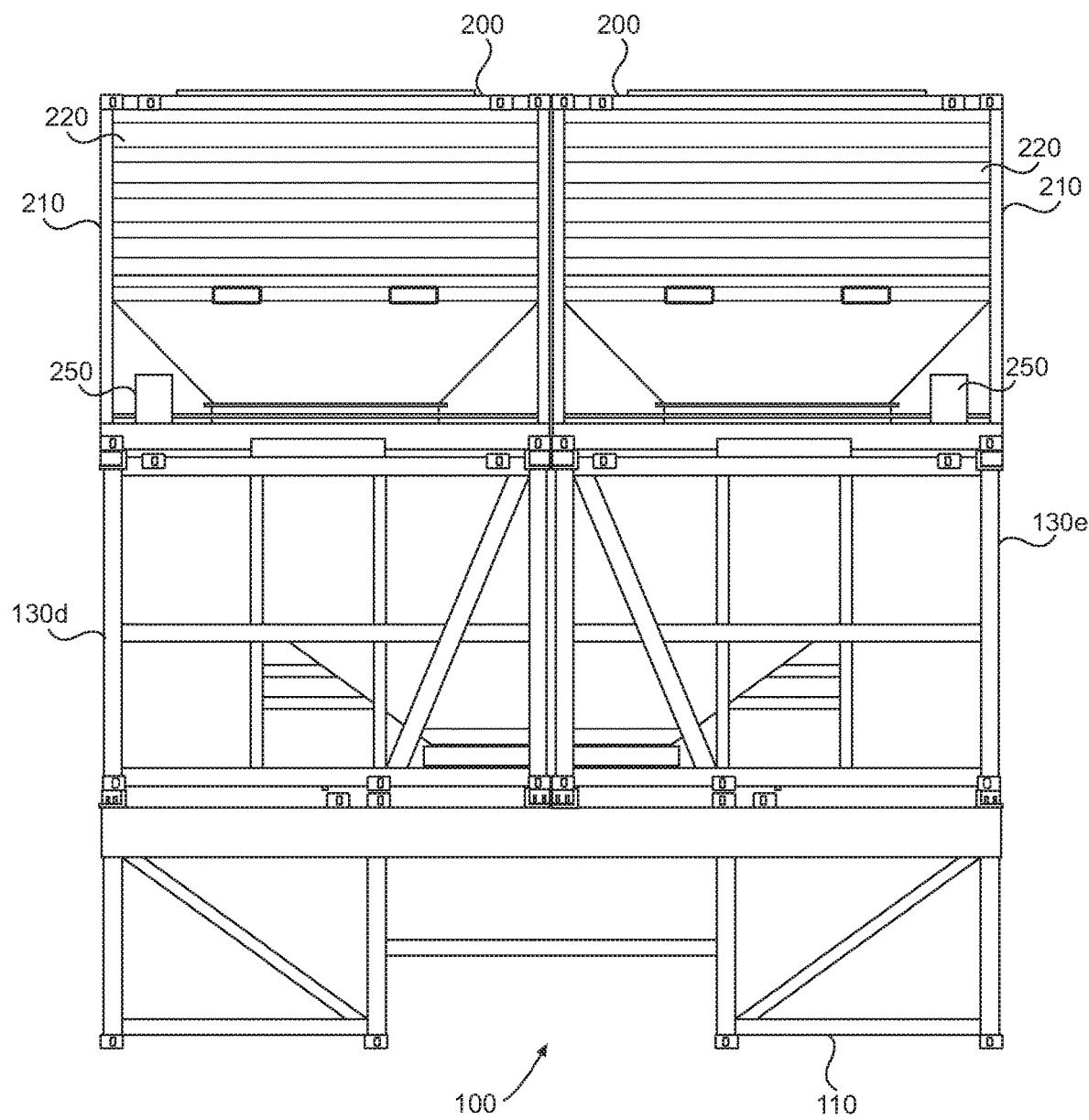
Figure 2C:
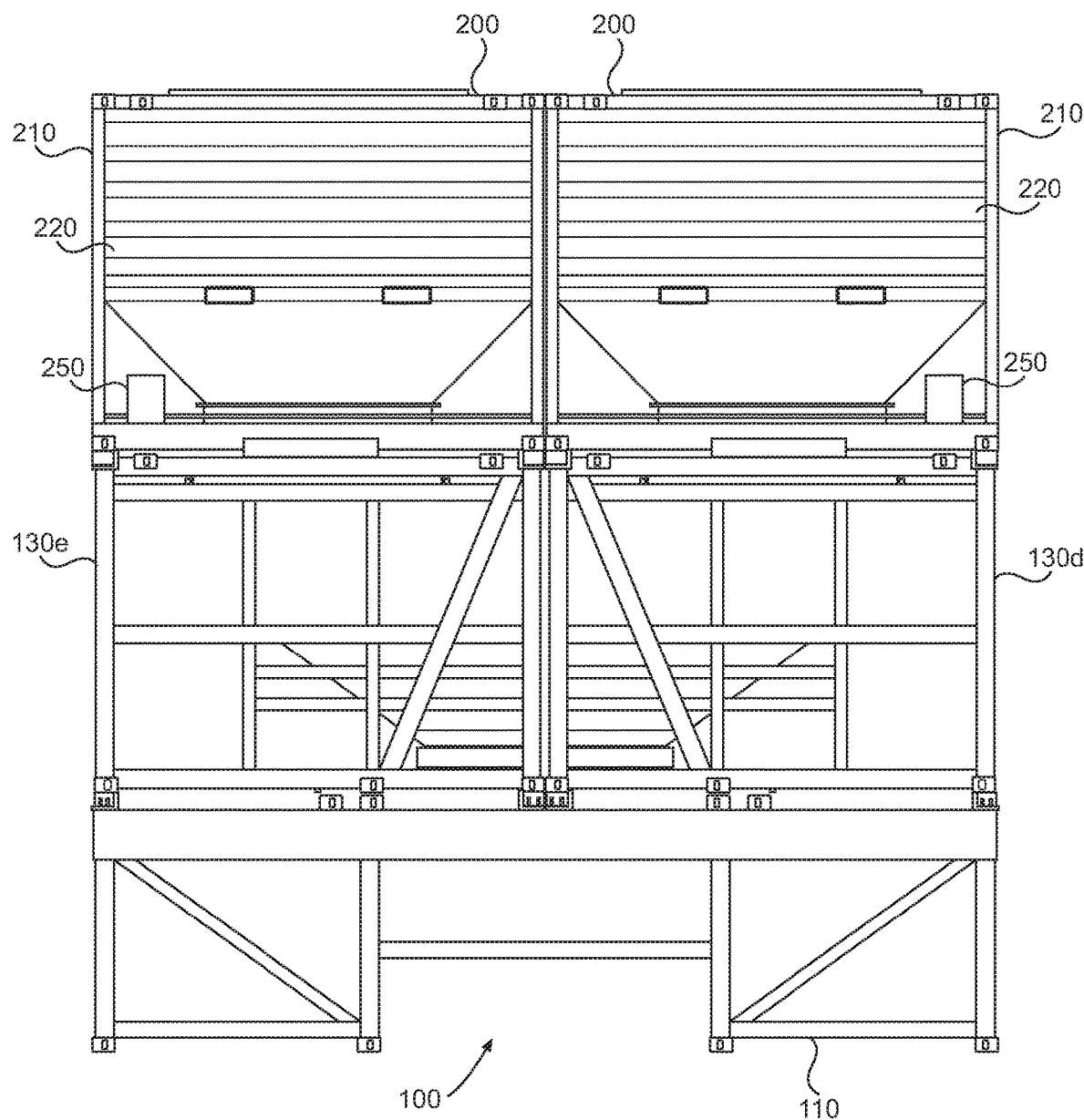
Figure 2E:
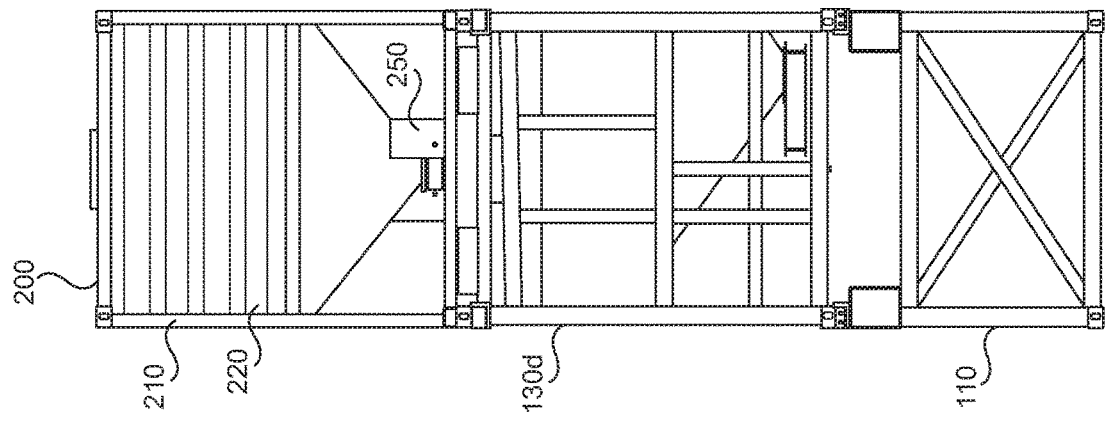
Figure 2D:
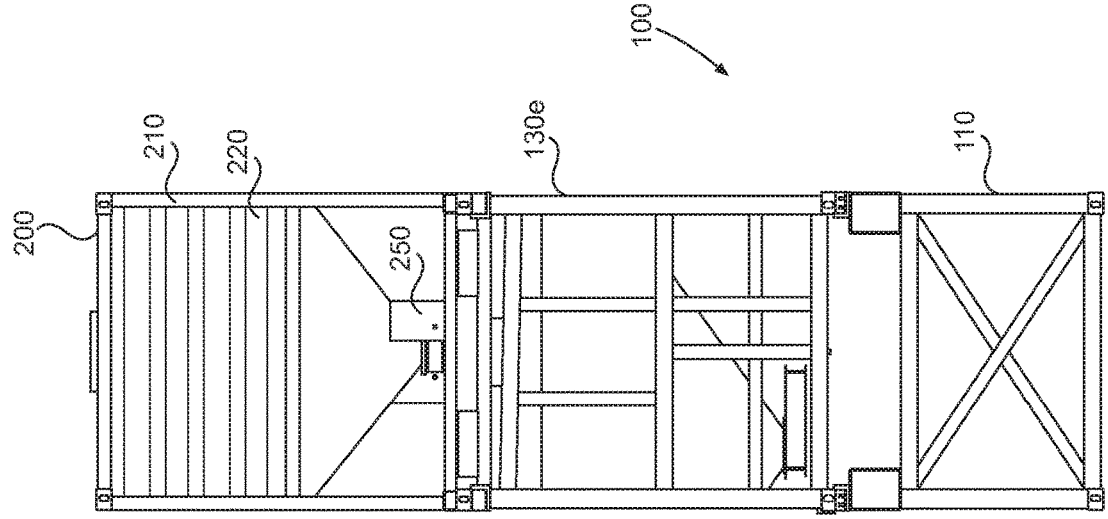
Figure 2F:
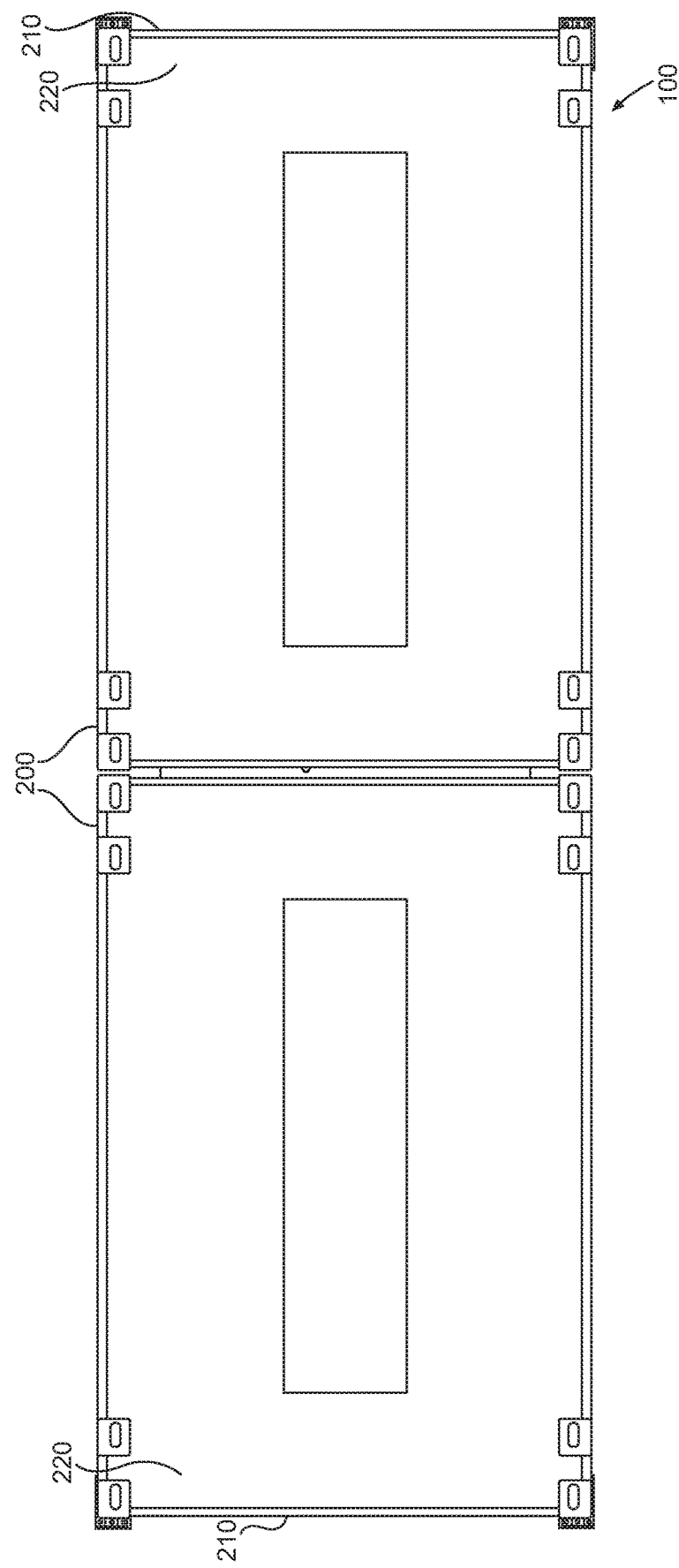
Figure 2G:
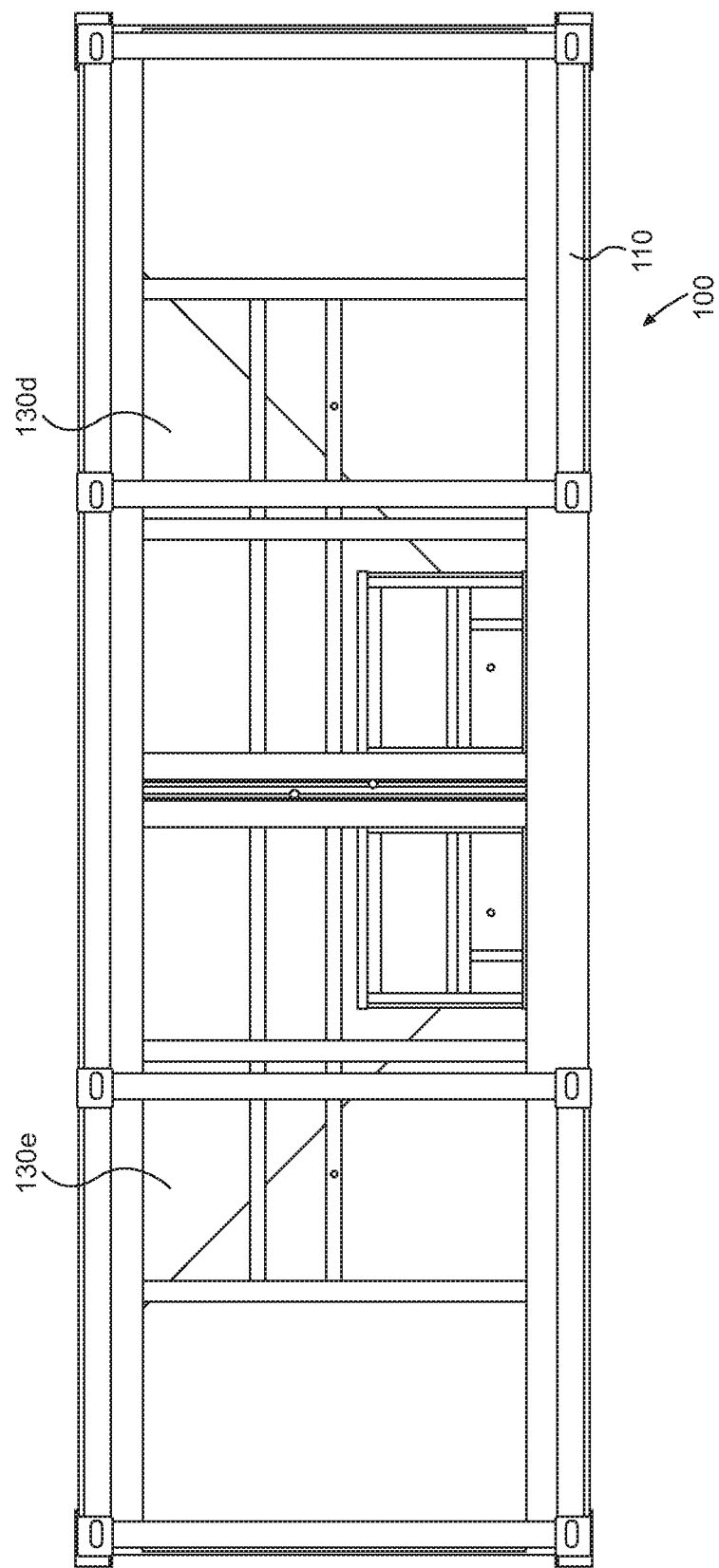
Figure 3A:
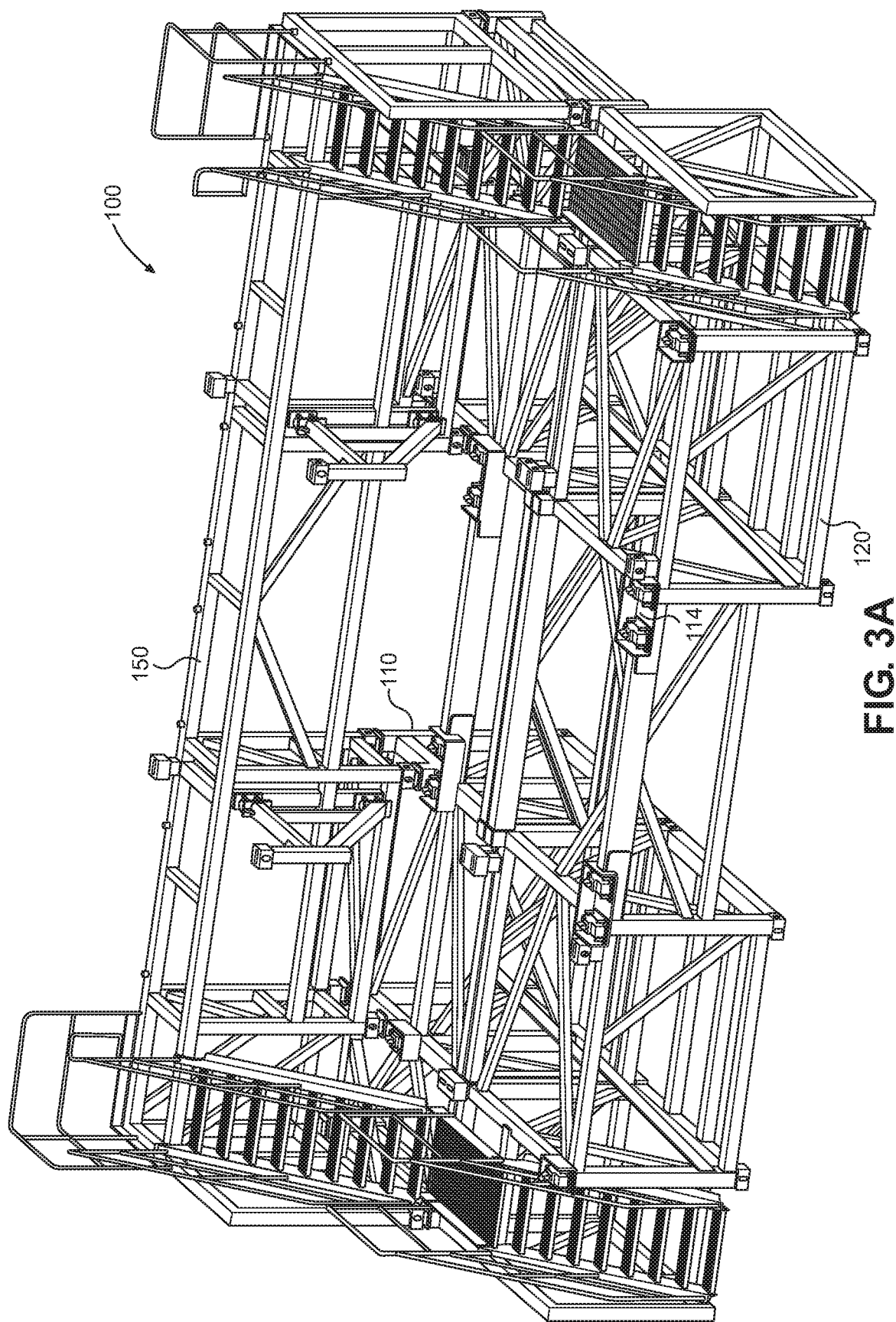
FIGS. 3a, 3b, 3c, 3d, 3e, 3f, and 3g are back perspective, front, back, right side, left side, top, and bottom views, respectively, of an aspect of a primary and a secondary base module of the modular material delivery system.
Figure 3B:
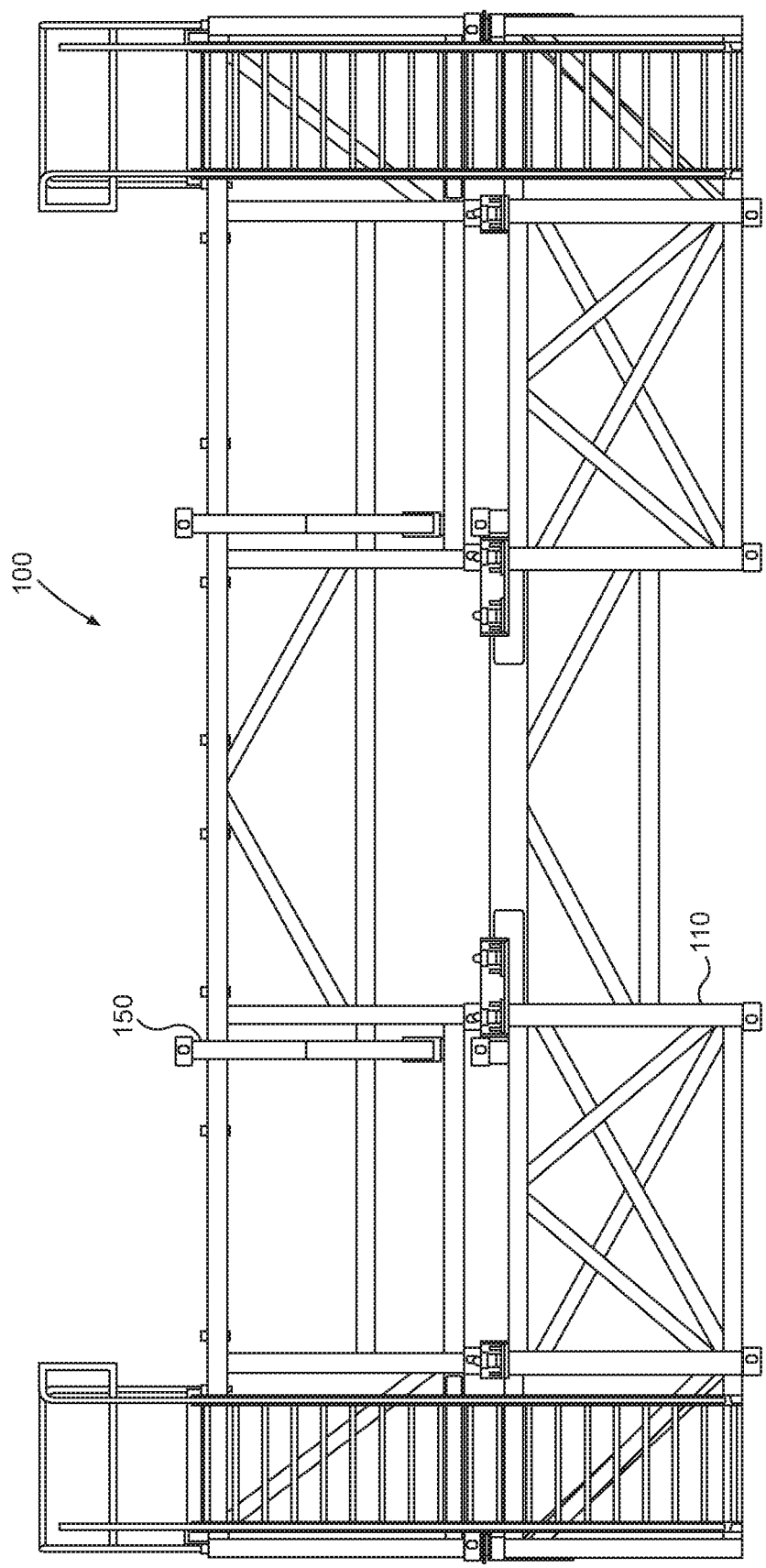
Figure 3C:
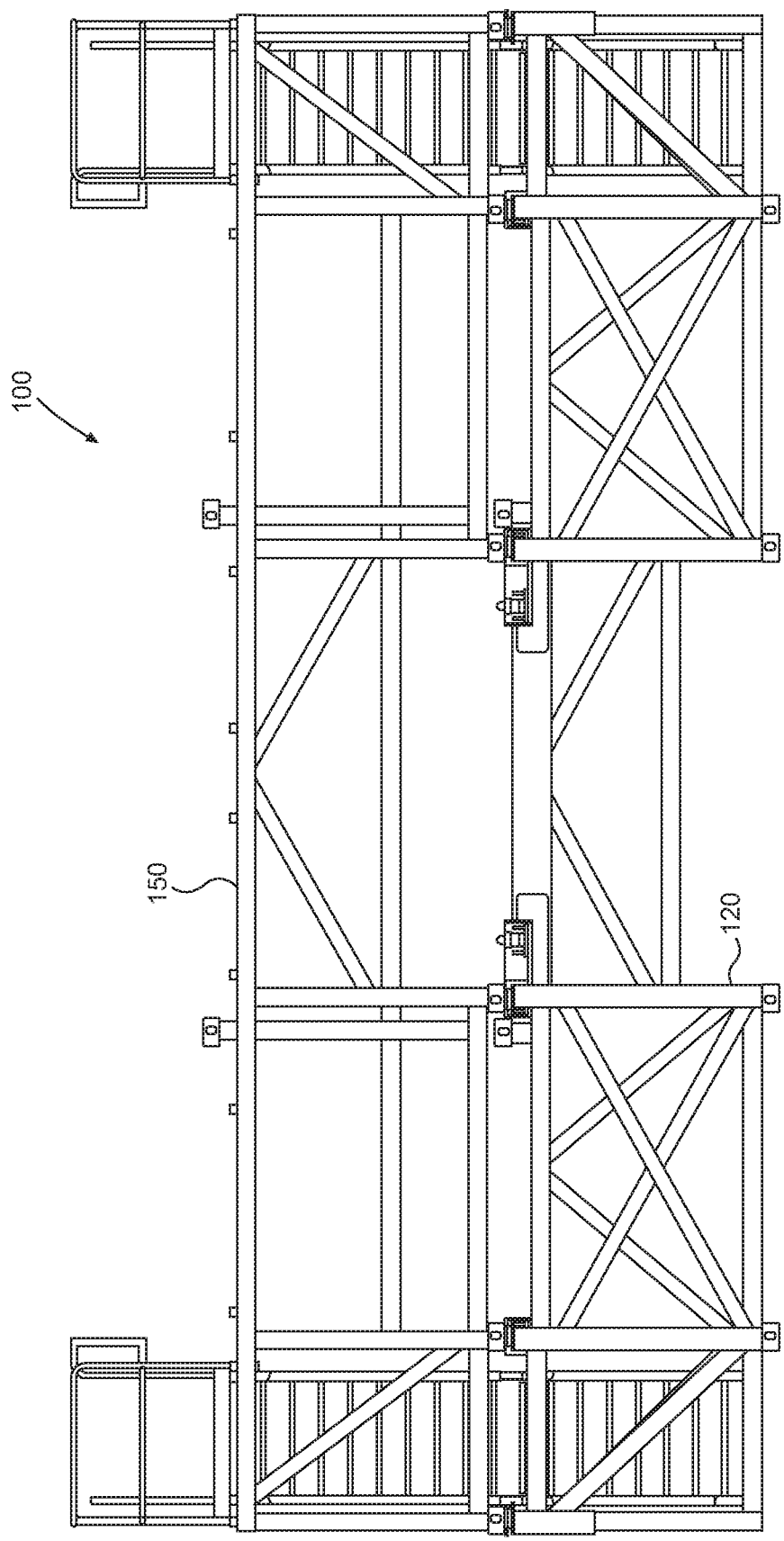
Figure 3E:
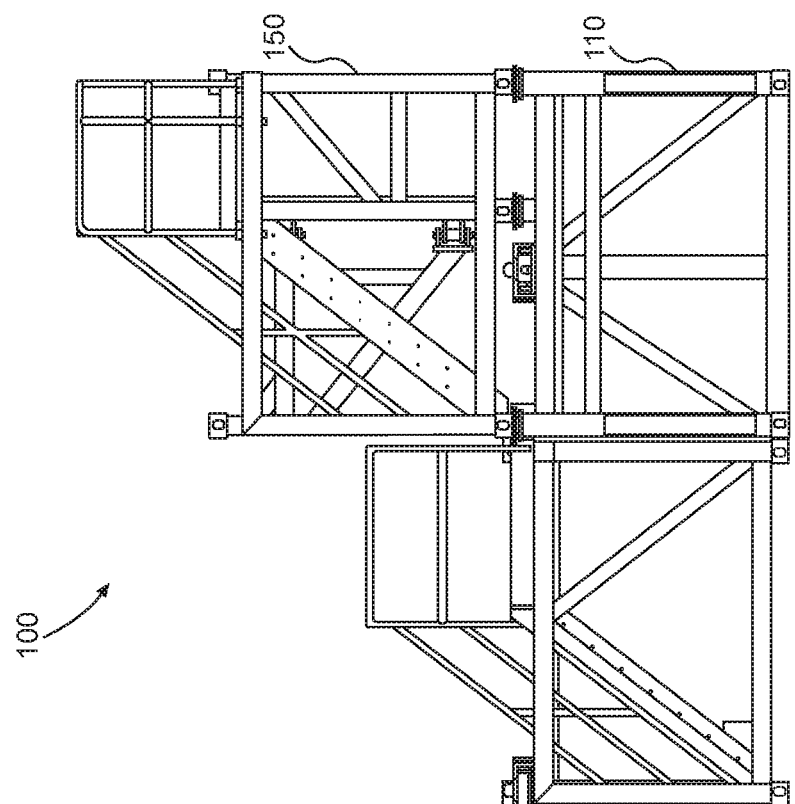
Figure 3D:
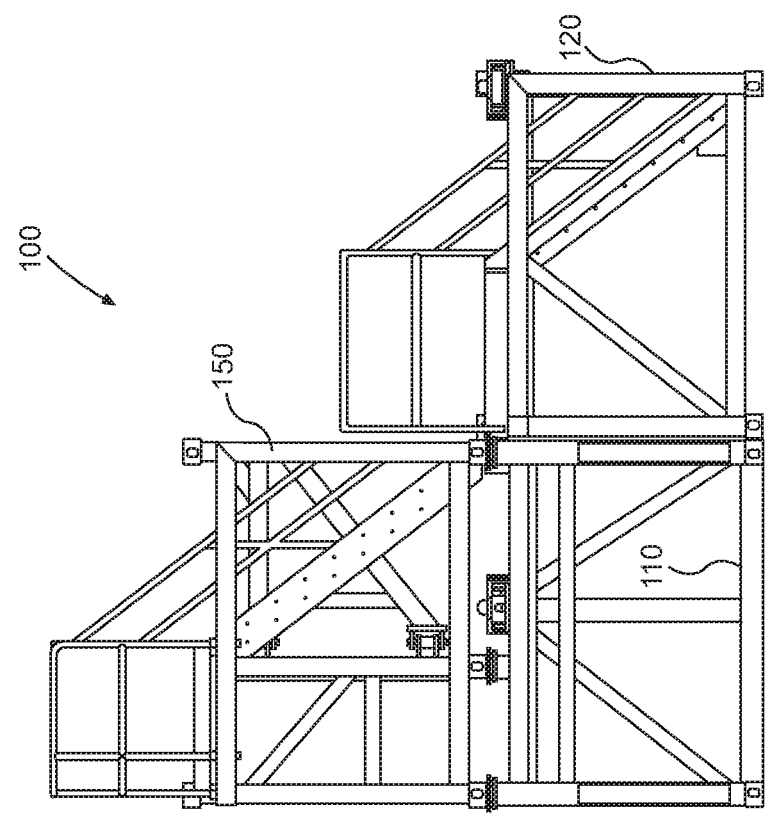
Figure 3F:
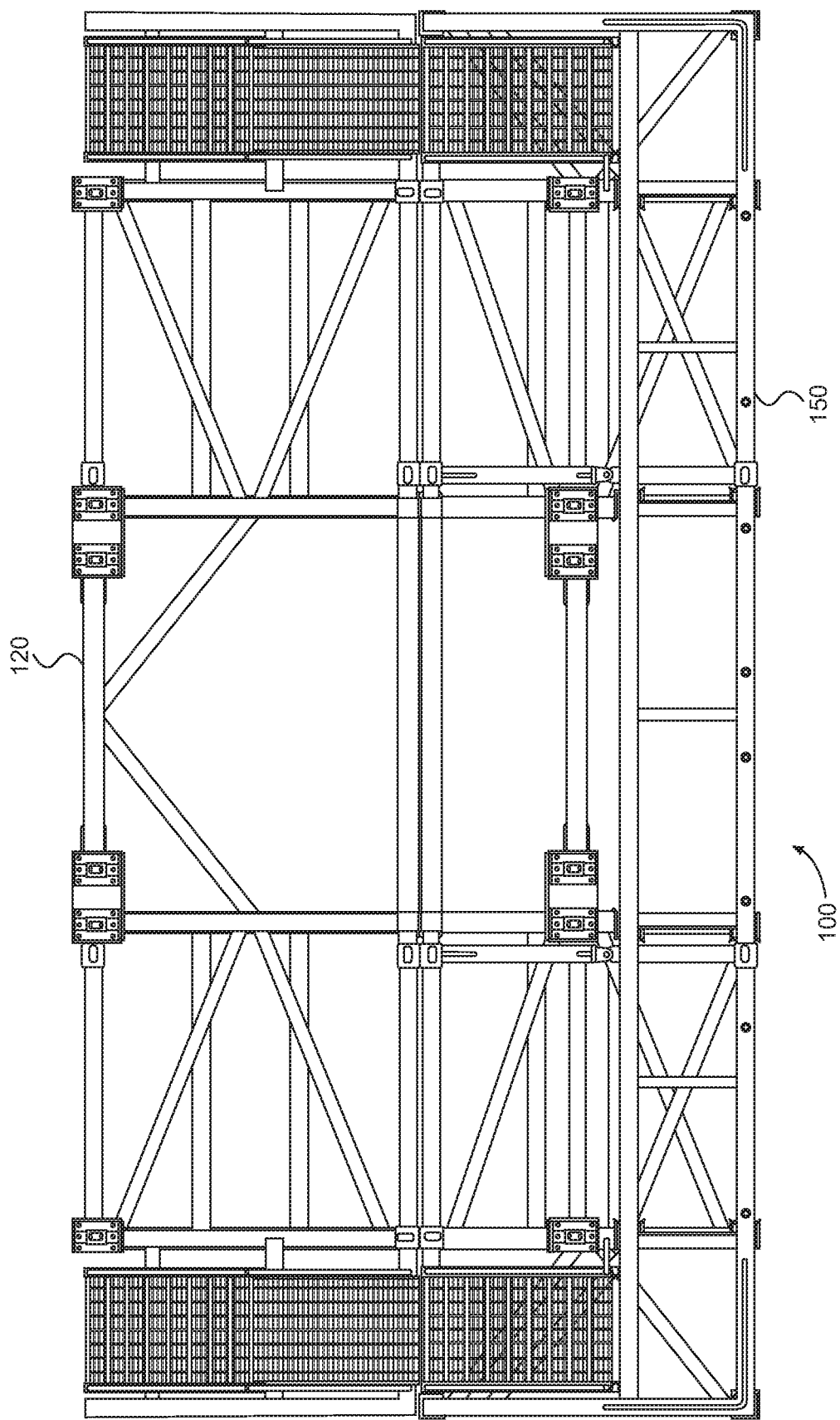
Figure 3G:
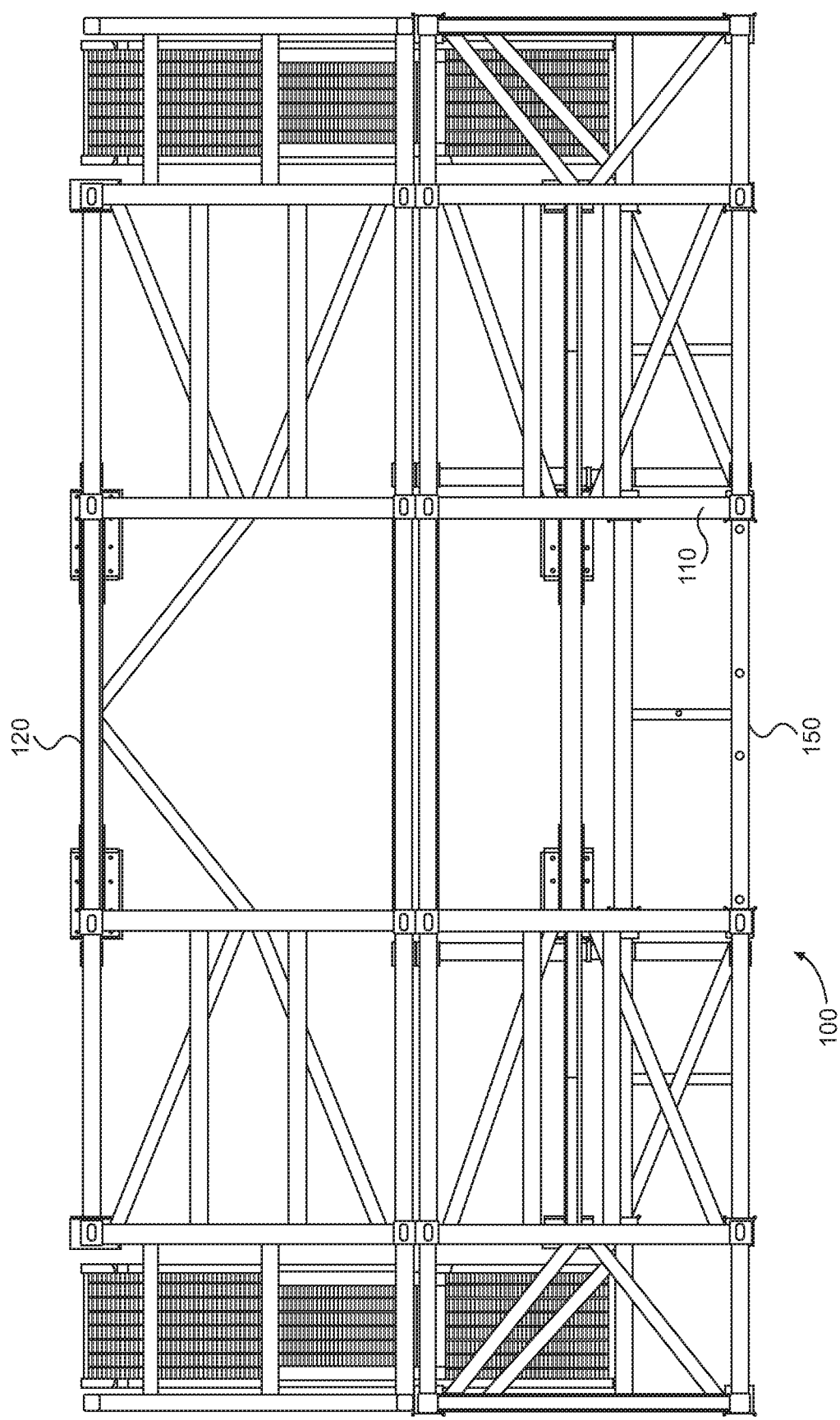

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claimed invention. Any other dimensions and materials not inconsistent with the purpose of the present application can also be used. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

FIGS. 1a, 1b, 1c, 1d, 1e, 1f, 1g, and 1h provide front perspective, back perspective, front, back, right side, left side, top, and bottom views, respectively, of an aspect of a modular material delivery system 100. FIGS. 2a, 2b, 2c, 2d, 2e, 2f, and 2g are front perspective, front, back, right side, left side, top, and bottom views, respectively, of another aspect of modular material delivery system 100. The present modular material delivery system 100 typically includes a primary base module 110, an optional secondary base module 120 (as shown in FIGS. 1a through 1h), a plurality of surge modules 130, an optional catwalk module 150 (as shown in FIG. 1a through 1h), and a plurality of material containers 200.

Primary base module 110 typically either fully supports two surge modules 130 extending end-to-end in parallel to primary base module 110 or partially supports three surge modules 130 extending side-by-side perpendicularly to primary base module 110. Secondary base module 120 is typically used with three surge modules 130, partially supporting three surge modules 130, as can be seen in FIG. 1a through 1h. At least one optional surge module ladder 155 along at least one side of primary base module 110 and secondary base module 120 can provide access to catwalk module 150. Each surge module 130 typically supports a single material container 200. Container gate actuators 250 may actuate elements of material containers 200 to allow distribution of particulate materials such as, but not limited to, proppant into surge modules 130.

Aspects using primary base module 110 and two surge modules 130 generally support up to two material containers 200, as can be seen in FIGS. 2a through 2g. Aspects using primary base module 110, secondary base module 120, and three surge modules 130 typically support up to three material containers 200, as can be seen in FIGS. 1a through 1h. In either aspect, when material descends from material containers 200, it is stored within at least one surge module 130 without any loss of material.

As shown in FIGS. 3a through 3g, primary base module 110 usually includes a primary support frame 111 designed of interconnected vertical, horizontal, and/or angled structural steel members. In another aspect, container blocks placed at 12 feet by 8 feet or 10 feet by 8 feet spacing at the center of primary support frame 111 may match the lock pin spacing of a special tool carrier/container handler on a Kalmar RT240 or RT290 Rough Terrain Container Handler ("RTCH") or other suitable container handler. It should be understood that all references to container blocks include metal container corners, such as, but not limited to, container blocks manufactured according to ISO standard 1161 or any other ISO standard. It should be further understood that all references to the RTCH include all models of the RTCH or any other equivalent machine. It should be further understood that other tool carrier/container handlers, as well as other containers, container blocks, and container corners, that are not inconsistent with the with the purpose of the present application can also be used.

The front side of primary base module 110 is typically designed with an open frame space 112 10 feet or 12 feet wide at its center to accommodate the blender hopper. The structure of primary base module 110 can typically carry the load of primary storage modules 130 and material containers 200 placed on top of primary storage modules 130. Primary base module 110 is also specially designed to be advantageously placed directly over the blender hopper so that material may gravity flow into the blender hopper from surge modules 130 above with minimal additional displacement.

Secondary base module 120 typically includes a secondary support frame 121 designed of interconnected vertical, horizontal, and angled structural steel members. In another aspect, container blocks may be placed at 12 feet by 8 feet or 10 feet by 8 feet spacing at the center of secondary support frame 121 to match the lock pin spacing of the special tool carrier on the RTCH. The structure of secondary base module 120 can carry the load of surge modules 130 and material containers 200 placed on top of secondary base module 120.

Either or both of primary base module 110 and secondary base module 120 may include at least one base outrigger 113 rotatably or removably connected to at least one corner or side of primary base module 110 and/or secondary base module 120. Certain aspects may have four or more base outriggers 113 located around the periphery of primary base module 110 and/or secondary base module 120. Base outrigger 113 generally provides stability to prevent material delivery system 100 from tilting or tipping over. Either or both of primary base module 110 and secondary base module 120 may include at least one base load cell socket 114 for mounting a load cell 160 to monitor the weight of material remaining in material container 200 and surge module 130. Load cells 160 may transmit such data for recordation or display on an optional base display panel 115 removably or permanently mounted to primary base module 110 or secondary base module 120.

As shown in FIGS. 3a through 3g, catwalk module 150 is typically located atop primary base module 110 and in front of surge modules 130, providing physical and visual access to surge storage modules 130 and material containers 200. Open catwalk frame space 151 at the center of catwalk frame 152 may accommodate the blender hopper along with frame space 112. Catwalk guardrails 153 on the front of catwalk module 150 can provide operators with handholds if necessary and reduce falling risk. Catwalk walkway 154 may be located atop catwalk frame 152 with an open grating or mesh construction to prevent potentially hazardous buildup of particulates or fluids. Catwalk frame 152 typically includes interconnected vertical, horizontal, and angled structural steel members, with container blocks at corner and interior points. Container blocks placed at 12 feet by 8 feet, 10 feet by 8 feet, or other spacing at the center and/or corners of catwalk frame 152 may match the lock pin spacing of the special tool carrier on the RTCH.

Figure 4A:
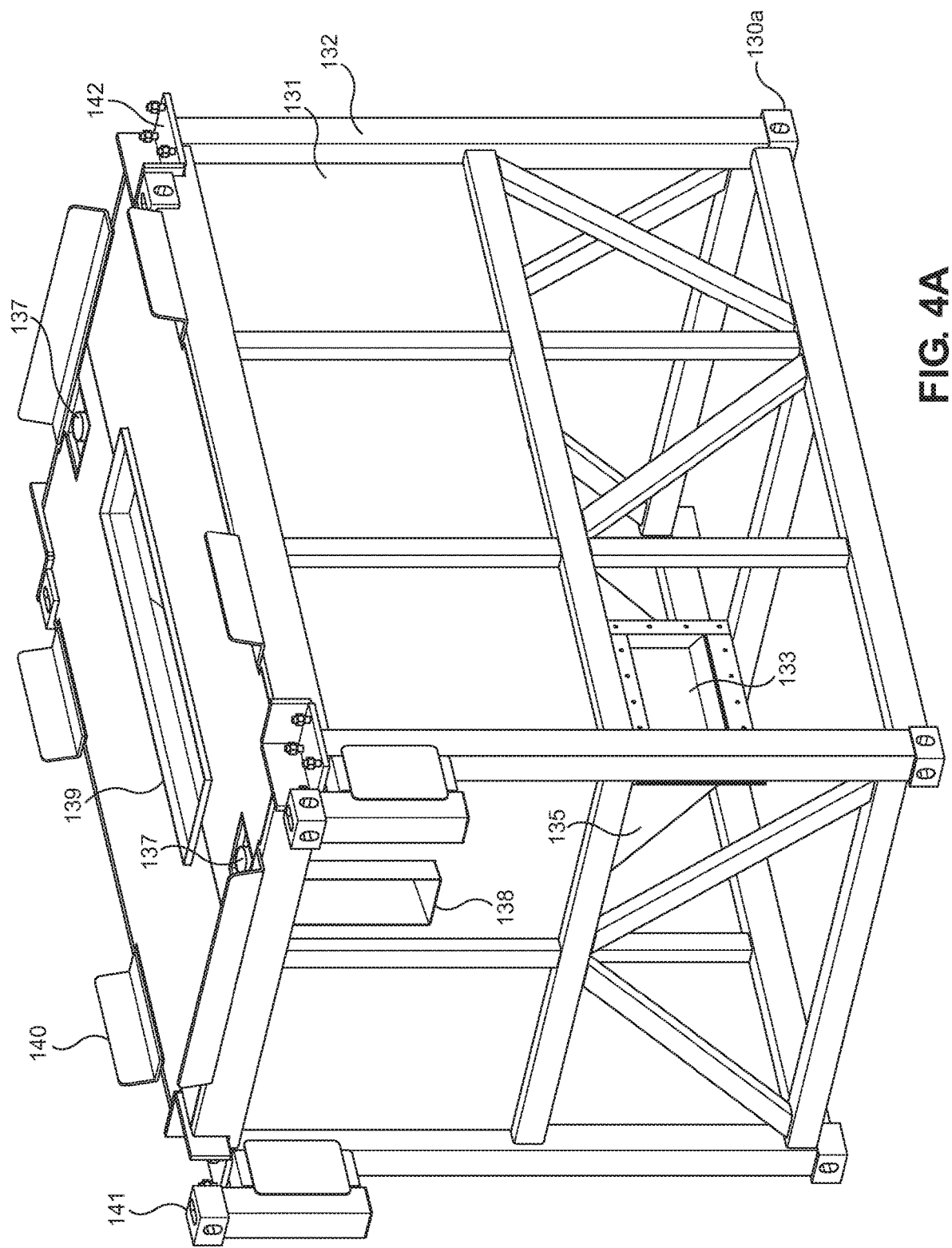
Figure 4C:
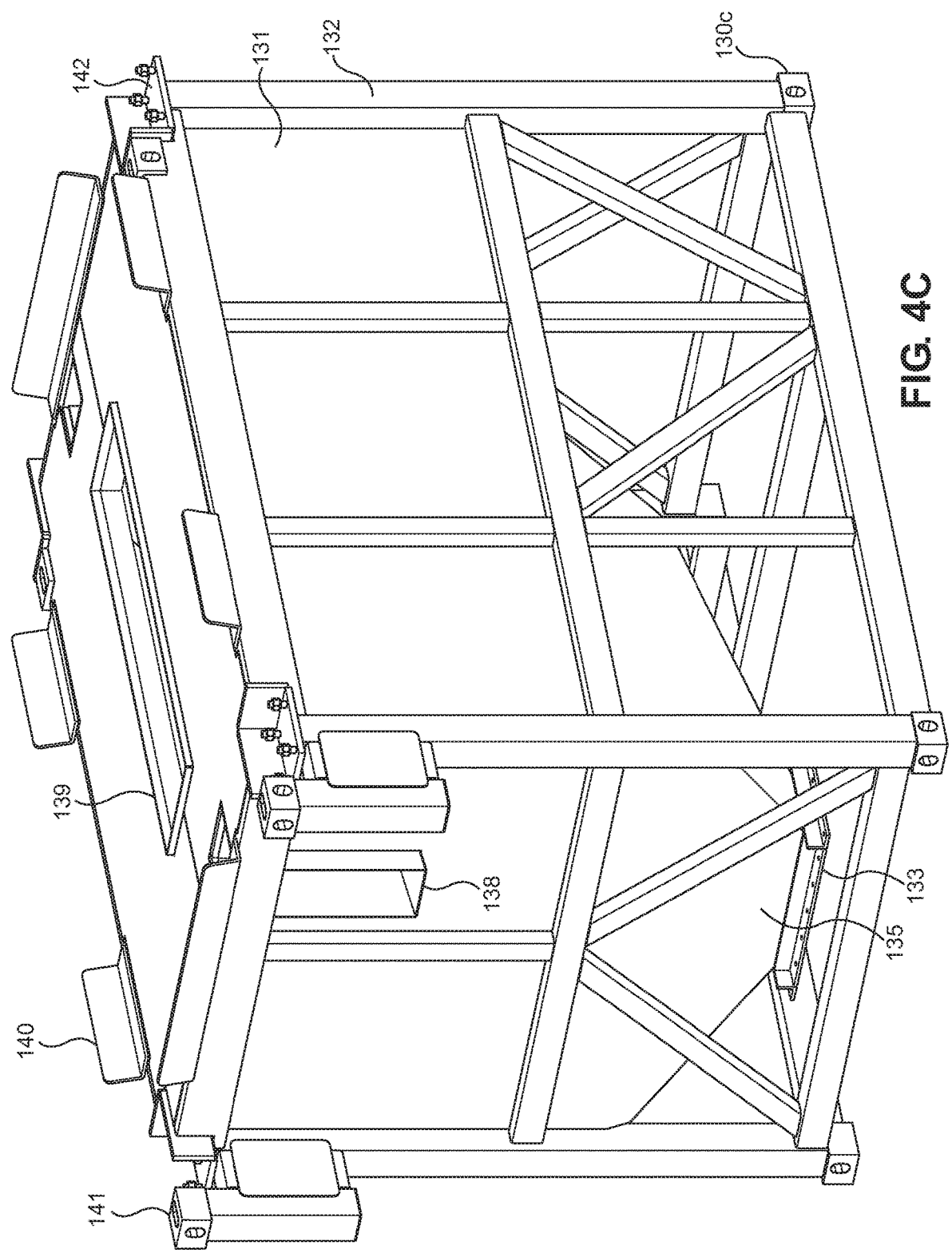
Figure 5E:
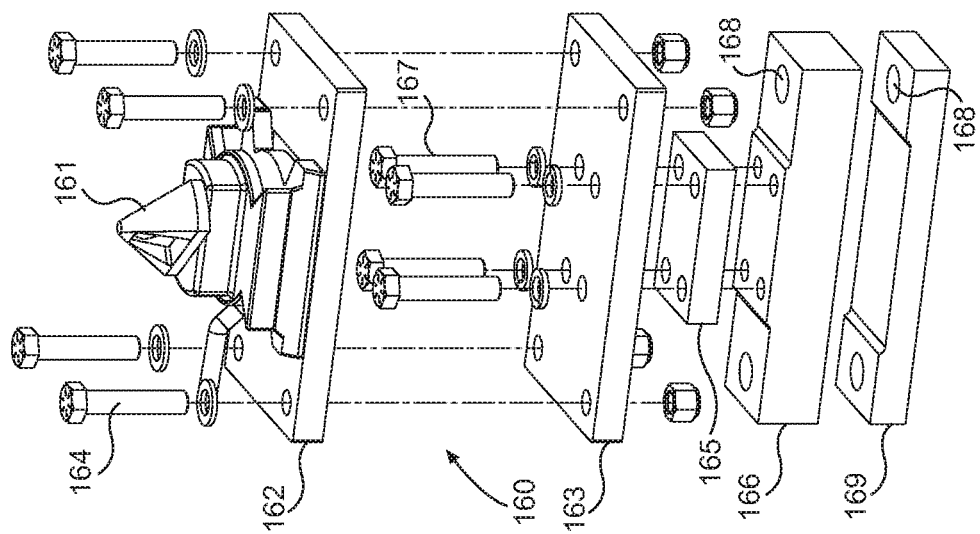
FIGS. 5a, 5b, 5c, 5d, and 5e are perspective, front, top, side, and exploded views, respectively, of an aspect of a load cell of the modular material delivery system.
Figure 5C:
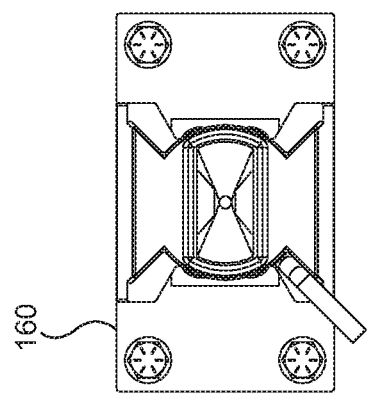
Figure 5D:
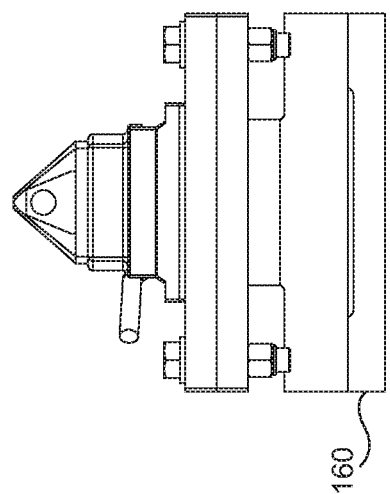
Figure 5A:
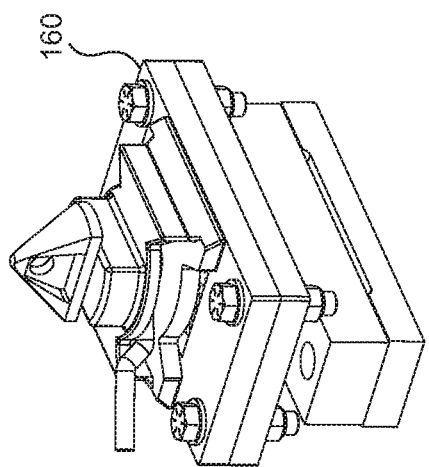
Figure 5B:
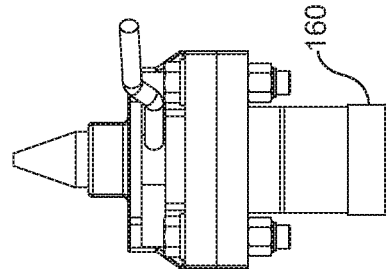
Figure 6A:
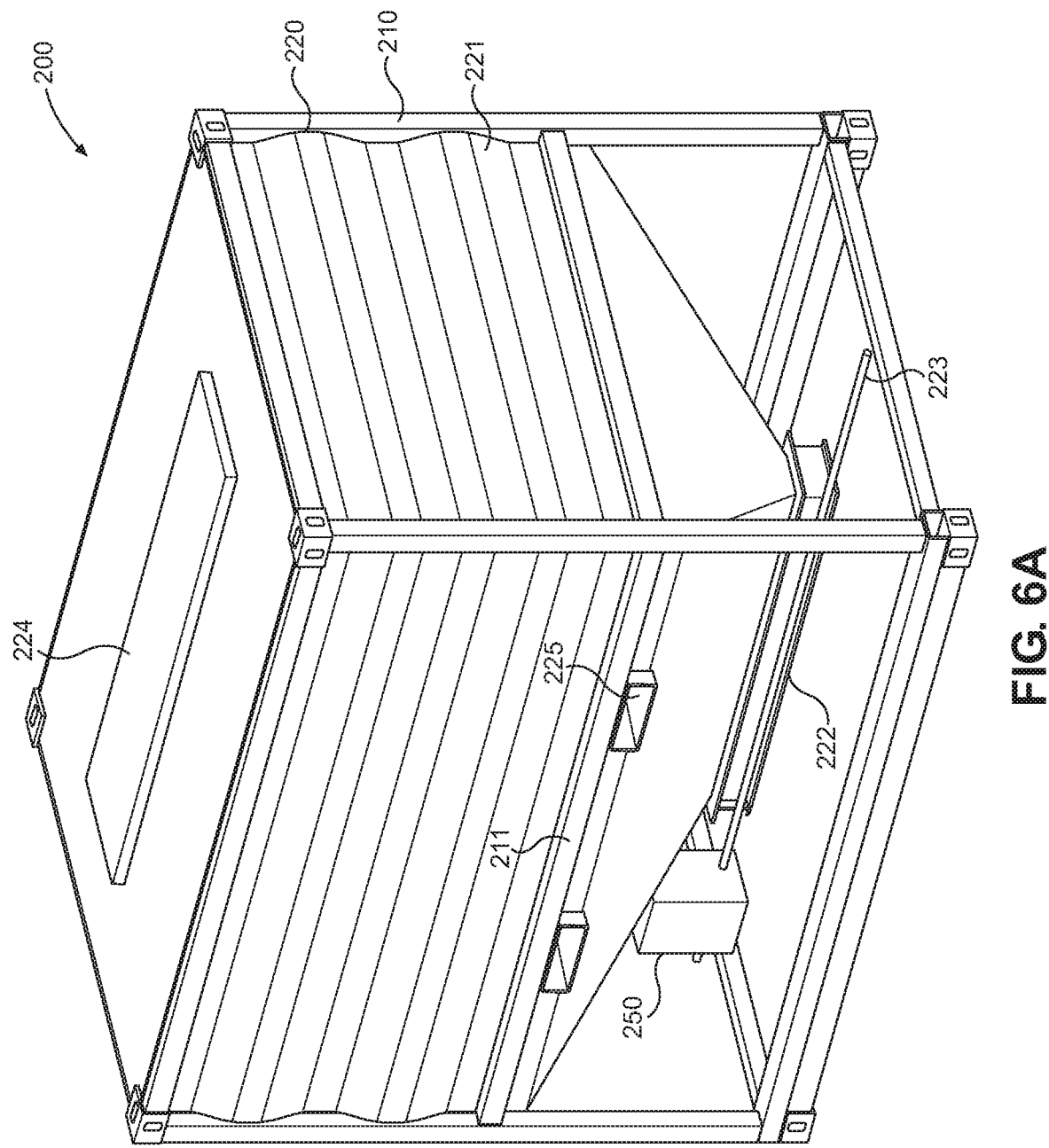
FIGS. 6a, 6b, 6c, 6d, 6e, 6f, and 6g are front perspective, front, back, right side, left side, top, and bottom views, respectively, of material containers of the modular material delivery system.
Figure 6B:
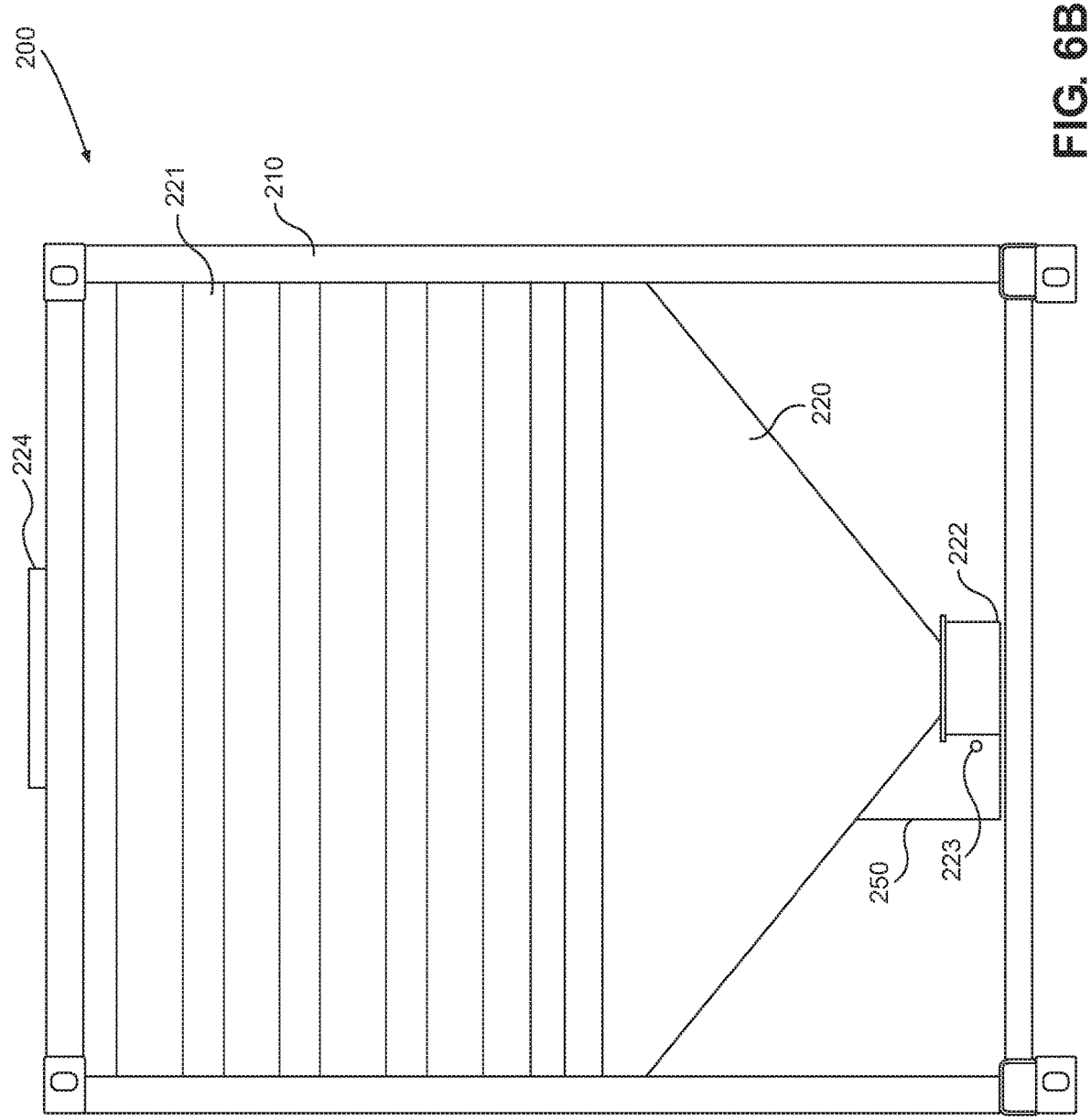
Figure 6C:
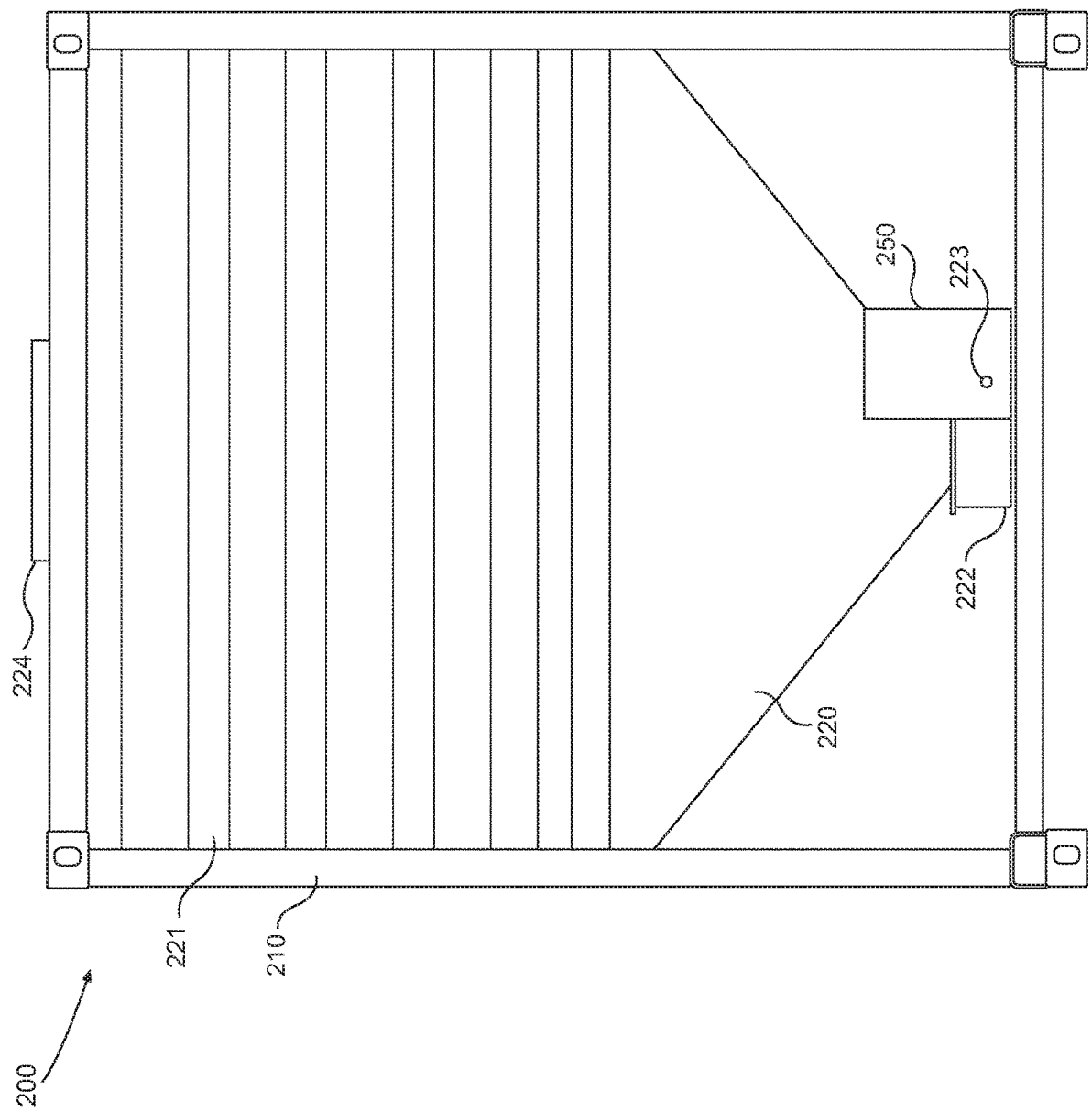
Figure 6D:
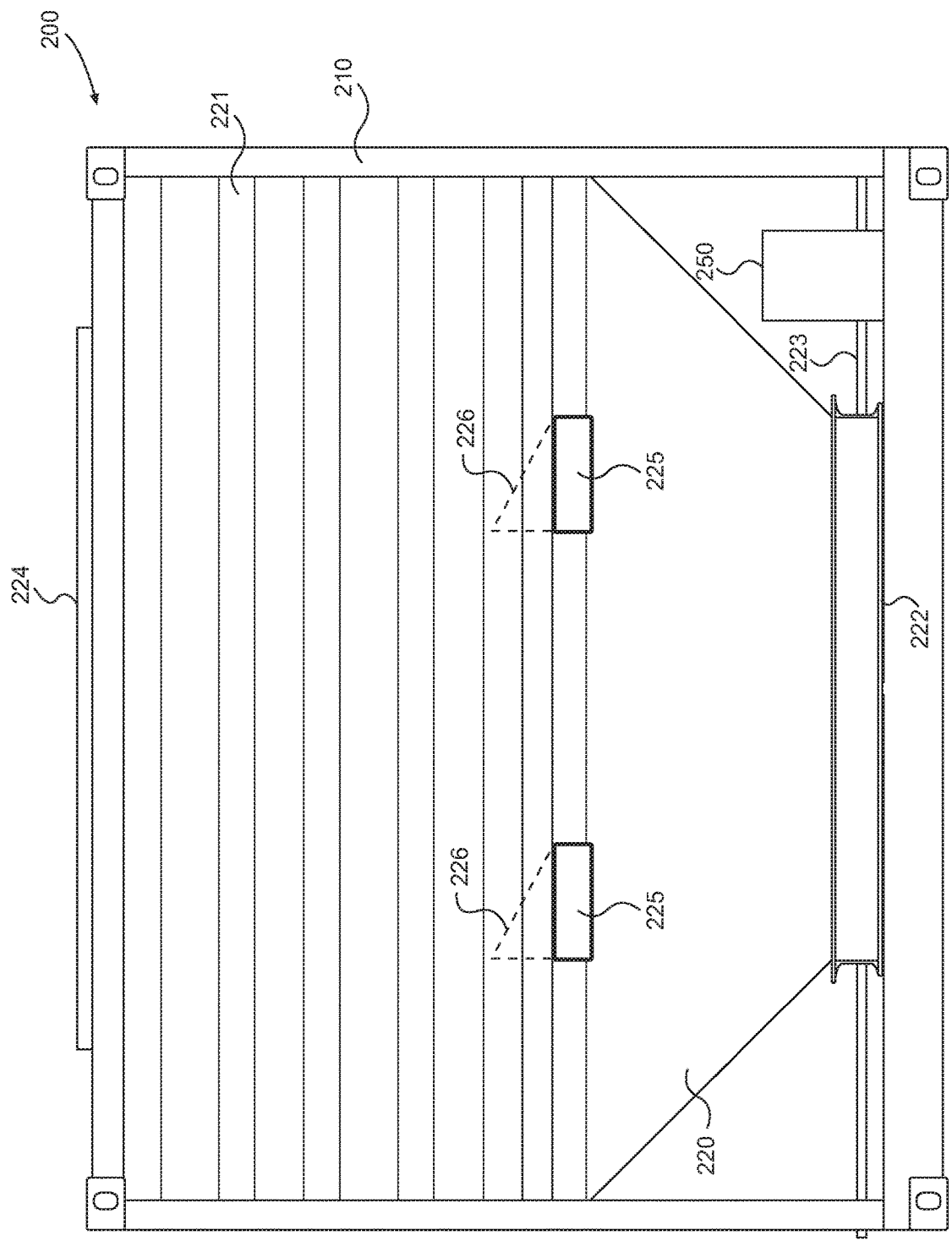
Figure 6E:
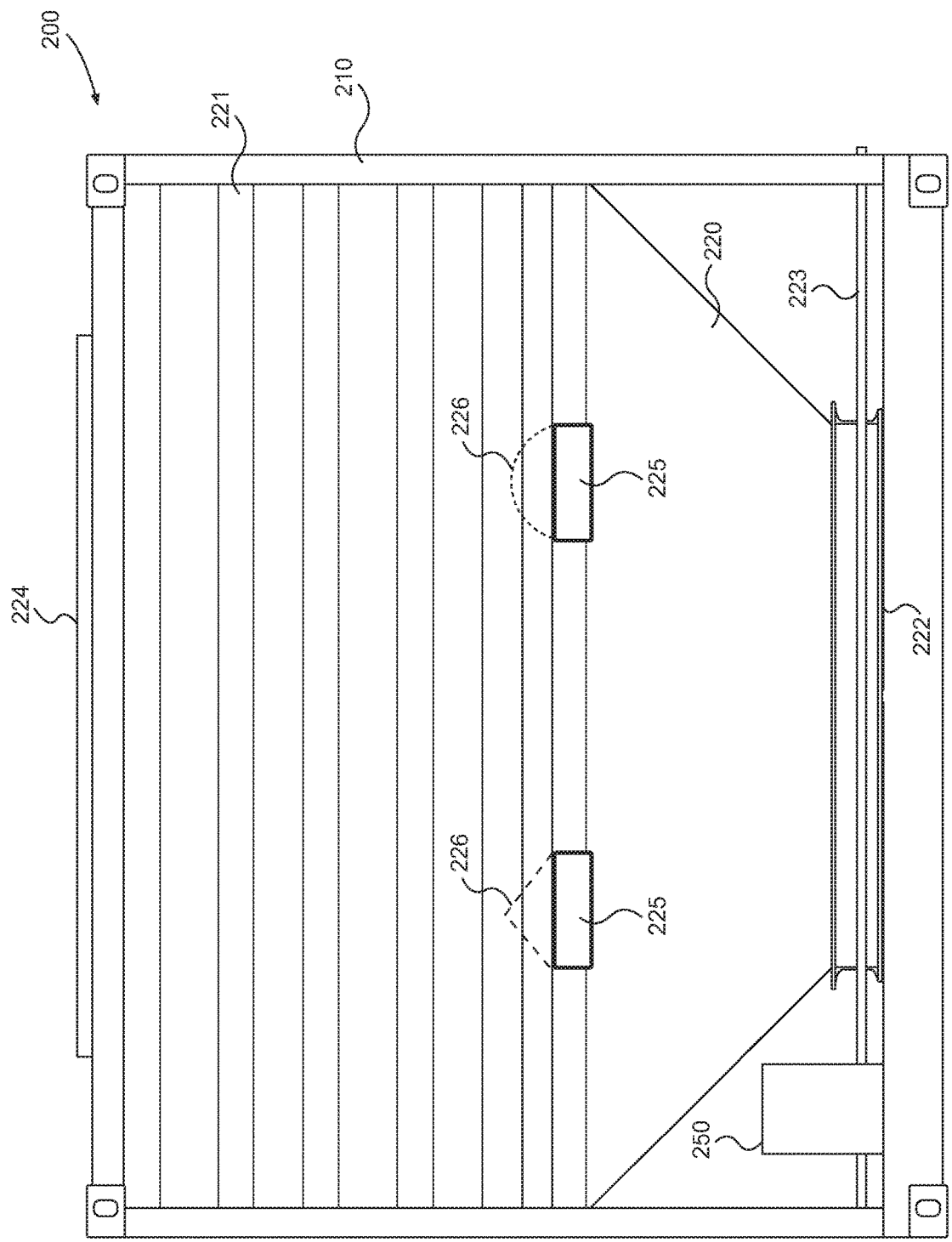
Figure 6G:
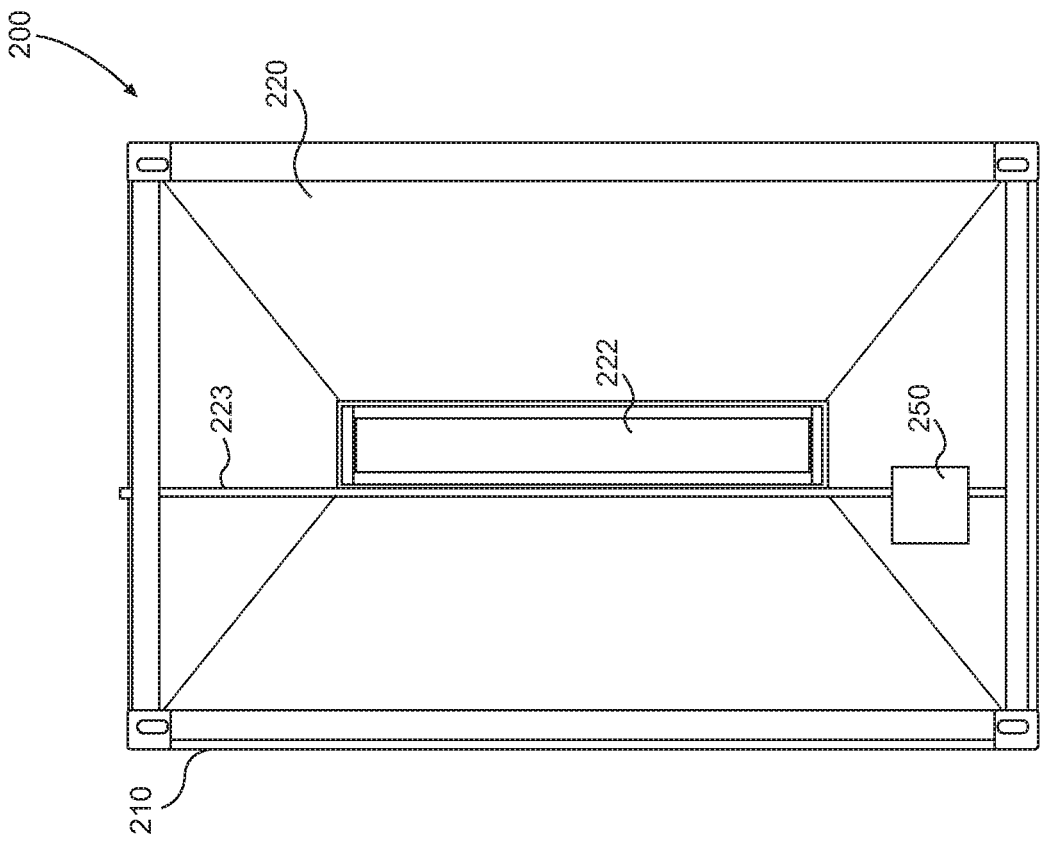
Figure 6F:
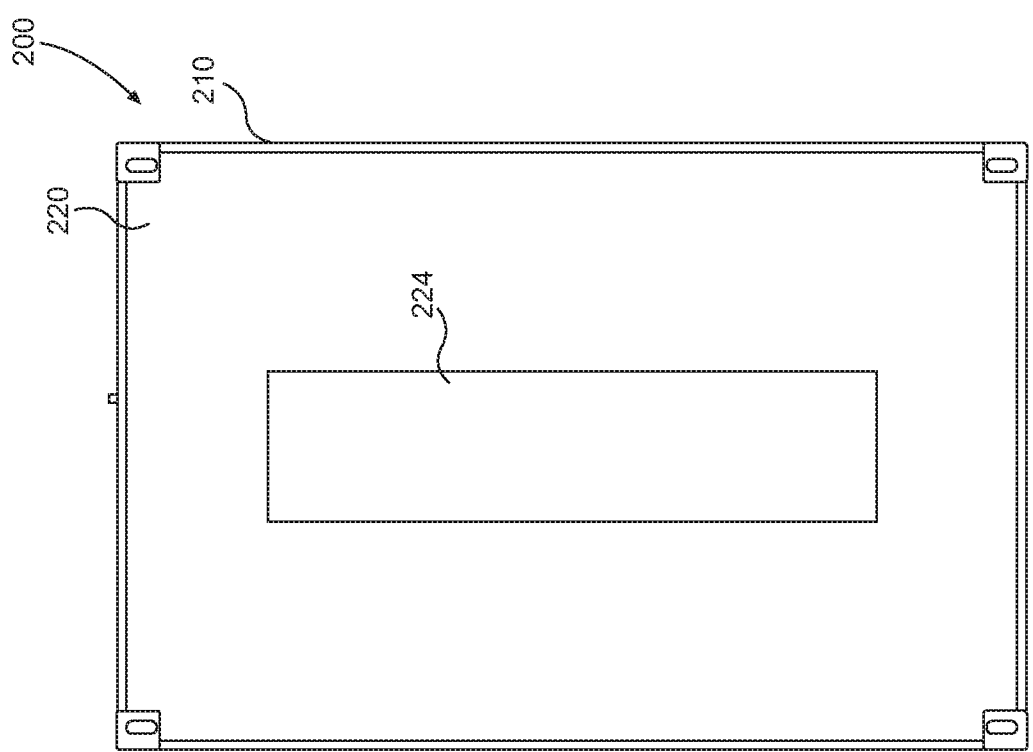

As shown in FIGS. 4a through 4c, each surge module 130 is typically designed with an enclosed surge hopper 131 to fit within a surge frame 132. Surge hopper 131 generally has a descending tapering structure forming a surge delivery chute 135. Surge hopper 131 can taper inwardly from the left and/or right sides, and inwardly from at least the back side to direct material towards the blender hopper. In the aspect shown in FIGS. 1a through 1h, surge hopper 131 for surge module 130a tapers inwardly from the left, surge hopper 131 for surge module 130b tapers inwardly from the right, and surge hopper 131 for surge module 130c tapers inwardly from both sides. Each surge hopper 131 for surge modules 130a, 130b, and 130c also tapers inwardly from the back side. The aspect shown in FIGS. 2a through 2g, uses two surge modules 130d and 130e, with surge hopper 131 for surge module 130d tapering inwardly from the left, and surge hopper 131 for surge module 130e tapering inwardly from the right. Each surge hopper 131 for surge modules 130d and 130e also tapers inwardly from the back side.

The capacity of surge hopper 131 is typically 10,000 to 52,000 pounds of material. Other larger or smaller desired capacities can likewise be used. Surge frame 132 typically includes interconnected vertical, horizontal, and angled structural steel members, with surge blocks 141 at corner and interior points. Surge blocks 141 are container blocks placed at 12 feet by 8 feet or 10 feet by 8 feet spacing at the center of surge frame 132 may match the lock pin spacing of the special tool carrier on the RTCH. In certain aspects, surge blocks 141 may be exteriorly displaced from the corners of surge frame 132 to accommodate additional elements on surge frame 132.

In various aspects, a surge discharge gate 133 typically may extend and slide either vertically along the interior left or right face of surge frame 132 (between surge hopper 131 and surge frame 132) or horizontally within surge frame 132. Surge hopper discharge gate 133 is designed to allow gravity flow of material from surge hopper 131 through surge delivery chute 135 to the blender hopper. Each surge discharge gate 133 may be actuated by a surge gate actuator 134. Surge gate actuators 134 may be electric, pneumatic, or hydraulic actuators, or any combination thereof. In certain aspects, two or more surge discharge gates 133 can be controlled by the same surge gate actuator 134.

At least one surge control box 136 can provide power and commands to surge discharge gate 133 and at least one container weight actuator 137. Each container weight actuator 137 is an actuator which may be configured to actuate a container gate actuator 250 on material container 200. In one aspect, container weight actuator 137 can be a linear electrical actuator moving upwards when actuated. In other aspects, weight actuator 137 may be a linear or non-linear electrical, hydraulic, pneumatic, or piezoelectric actuator. Other suitable actuators can likewise be used for container gate actuator 250. Container weight actuator 137 is typically located in a container actuator recess 138 set into surge module 130. When material container 200 is moved to or from its position atop surge module 130, container weight actuator 137 is fully retracted into container actuator recess 138 to prevent damage to container weight actuator 137. A surge loading hatch 139 on top of surge hopper 131 can allow entry of material into surge hopper 131 from material container 200.

Certain aspects of surge module 130 may include surge container retainers 140, raised rails located atop surge frame 132 to prevent material container 200 from sliding off of surge module 130 if surge blocks 141 do not properly engage. This allows an operator to reengage material container 200 and maneuver it into a better connection with surge module 130 without risk of material container 200 falling off and rupturing, damaging other equipment, or injuring site personnel. Certain aspects of surge module 130 may also include at least one surge load cell socket 142 for mounting a load cell 160 to monitor the weight of material remaining in material container 200. Load cells 160 may transmit such data for recordation or display on an optional surge display panel 143 removably or permanently mounted to surge module 130.

Surge modules 130 typically consist of a design structure that can carry the load of full material containers 200 placed on top of surge modules 130. Surge modules 130 typically are specially designed to gravity feed the material to the relatively small blender hopper. Surge modules 130 are also typically designed to store a volume range of up to 52,000 pounds of material. Other desired larger or smaller volume ranges can be used as well.

FIGS. 5a through 5e are various views of load cell 160. Each load cell 160 may include a half twist lock 161 mounted to a lock plate 162. Twist lock 161 can removably connect load cell 160 to a container block on the bottom of surge module 130 or material container 200. Lock plate 162 may be connected to a twist lock mounting plate 163 via a plurality of lock fasteners 164 extending through lock plate 162 and twist lock mounting plate 163. Twist lock mounting plate 163 may be connected to a load cell top plate 165 and a load cell transducer 166 by plate fasteners 167 that extend through the three components.

Part of base load cell socket 114 or surge load cell socket 142 can extend upward through placement apertures 168 running through load cell transducer 166 and a load cell bottom plate 169 to hold load cell 160 in place in system 100. Load cell 160 is capable of real-time monitoring of weight placed upon it via load cell transducer 166. This functionality allows system operators to continuously monitor the amount of material remaining in surge modules 130 and/or material containers 200, depending on the location of load cell 160. Load cell 160 may include a wired or wireless connection from load cell transducer 166 to a recording or display element, such as base display panel 115 or surge display panel 143.

FIGS. 6a through 6g are various views of material container 200. Each material container 200 typically comprises a container frame 210 supporting a container vessel 220. Container frame 210 generally includes interconnected vertical and horizontal structural steel members, with container blocks at corner and interior points. In one aspect, container blocks placed at 12 feet by 8 feet or 10 feet by 8 feet spacing on container frame 210 may match the lock pin spacing of the special tool carrier on the RTCH. Container vessel 220 is typically made from polymer, carbon fiber, a composite, metal, or any combination thereof. Container vessel 220 usually has four container walls 221 which may be permanently or removably attached to container frame 210 by means of welding, bolts, clamps, adhesives, locking mechanisms, or any other attachment means known in the art. At least two container walls 221, and in some aspects, all four container walls 221, may slope at least partially inwardly from the front, back, left, and right sides of container frame 210. Certain portions of the top and sides of container vessel 220, including container walls 221, can include corrugations to increase stiffness and strength. It should be further understood that other container blocks not inconsistent with the with the purpose of the present application can also be used.

A container discharge gate 222 in the bottom of container vessel 220, operably coupled to container gate actuator 250, typically allows material discharge from container vessel 220. Container discharge gate 222 typically extends horizontally along the bottom of container vessel 220. Container discharge gate 222 is usually designed to allow gravity flow of material from container vessel 220 into surge module 130. In certain aspects where container discharge gate 222 is a rack-and-pinion slide gate, a geared discharge shaft 223 can extend longitudinally along container discharge gate 222 and interconnectedly meshes with container discharge gate 222. Rotation of discharge shaft 223 generally causes container discharge gate 222 to slidably move along its latitudinal axis and open or close, depending on the direction of rotation. In one aspect, discharge shaft 223 extends from one side of container frame 210 to another side of container frame 210, supported by bearings in both sides of container frame 210.

At least one loading hatch 224 in the top of container vessel 220 typically allows loading of material. In one aspect, a plurality of fork tubes 225 extending through container vessel 220 between at least one pair of walls can allow use of a forklift in transporting material container 200. Because fork tubes 225 generally extend through material container 200 at a location above the bottom of material container 200, during transportation, material container 200 does not need to be raised as high by the forklift as other material containers, increasing stability of the forklift. Fork supports 211 generally extend externally of container vessel 220 and between elements of container frame 210. Because fork supports 211 are usually located directly above the openings of fork tubes 225, fork supports 211 can distribute some of the load from the prongs of the forklift to prevent fork tubes 225 from partially or completely tearing free of container vessel 220. To prevent material from accumulating atop fork tubes 225, curved or triangular diverter plates 226 are typically placed atop fork tubes 225 to shed any material.

FIGS. 7a through 7g are various views of an aspect of container gate actuator 250 of material delivery system 100. Container gate actuator 250 can include an actuator housing 251 typically mounted to an interior surface of container frame 210. In one aspect, actuator weight 252 slidably extends and retracts from a hollow actuator weight shaft 253 extending from actuator housing 251. Actuator weight 252 typically moves up and down within actuator weight shaft 253 as moved by container weight actuator 137. The mass of actuator weight 252 is generally high enough that actuator weight 252 descends by force of gravity to its lowest possible extension from actuator weight shaft 253 when not actively actuated by container weight actuator 137. This lowest possible extension is typically still above the lowest plane formed by container frame 210 to prevent accidental actuation of actuator weight 252.

The upper end of actuator weight 252 within actuator housing 251 generally includes an actuator weight clamp 254 rotatably and slidably connected to an actuator weight connector 255 to translate the vertical motion of actuator weight 252 to rotational motion. Actuator weight connector 255 may be connected to a rotating actuator arm 256 which rotates as actuator weight 252 rises and falls. Actuator arm 256 is usually attached to and rotates an actuator gear shaft 257, which in turn is attached to and rotates a toothed actuator gear 258. Actuator weight connector 255 is also typically connected to actuator gear 258, which also rotates as actuator weight 252 rises and falls. Actuator gear 258 usually meshes with geared discharge shaft 223 such that rotation of actuator gear 258 causes rotation of discharge shaft 223. Rotation of discharge shaft 223 generally causes container discharge gate 222 to slidably move along its latitudinal axis and open or close, depending on whether actuator weight 252 is moving up or down, respectively.

The aspect of container gate actuator 250 shown in FIGS. 7a through 7g can feature additional spring-biasing mechanisms. Elements 251 through 258 of spring-biased container gate actuator 250 have identical structure and function to those listed above. In addition, spring-biased container gate actuator 250 can also include an actuator spring 259 extending from actuator spring top plate 260, down through actuator spring housing 261, to actuator spring connector 262 atop the upper surface of actuator weight 252. In one aspect, actuator spring 259 is welded, soldered, glued, or otherwise attached to actuator spring connector 262. In another aspect, actuator spring 259 is at least partially coiled around actuator spring connector 262. In general use, the force of actuator spring 250 biases actuator weight 252 downwardly, reducing the likelihood of accidental actuation of spring-biased container gate actuator 250. In one aspect, actuator spring 259 is a helical spring, though other configurations of actuator spring 259 are contemplated.

In certain aspects, an adjustable, a threaded spring bolt 263 extends through a threaded spring nut 264 and a housing top plate 265. In one aspect, threaded spring nut 264 is welded atop housing top plate 265. Spring bolt 263 can allow adjustment of the spring bias force exerted on actuator weight 252. Rotation of spring bolt 263 in a first direction typically extends spring bolt 263 into actuator spring housing 261, forcing down actuator spring top plate 260 and increasing the spring bias force. Rotation of spring bolt 263 in a second direction generally retracts spring bolt 263 from actuator spring housing 261, allowing actuator spring top plate 260 to rise and decreasing the spring bias force.

In multiple aspects, the method for setup of material delivery system 100 is designed to efficiently assemble the primary base module 110, secondary base module 120, and surge modules 130 into one of multiple predesigned configurations for storing and delivering materials to a blender hopper on a well site.

Material delivery system 100 is typically a gravity delivery system that can deliver a controlled discharge volume of over 30,000 pounds per minute, which can be 200% faster deliver than the present delivery systems used. As a result, the material needed for an hour-long operation can be loaded in 15 minutes or less. The elimination of complicated conveyance systems typically prevents downtime and dust generation, and typically results in faster setup. In other aspects material delivery system 100 also has the capacity to store up to 120 tons of material at the blender hopper, available to be gravity fed to the blender hopper at the command of the blender operator. Other desired capacities can be used as well. The remaining material to be used for the fracturing and completion process typically can be stored on site in material containers 200 designed with the container blocks or equivalent.

The various components of material delivery system 100 typically are designed to be handled and erected on the well site using the RTCH or equivalent machine. Well sites can be located in remote rough terrain environments and require significant ground preparation work for set-up. Many require ground matting placement throughout the site for the use of mobile equipment, such as forklifts. The RTCH can add value over the use of other mobile equipment when used on the well site. It can offer supreme maneuverability in a rough terrain environment without the need for ground matting. The RTCH also can be used on well sites during the well fracturing and completion process, to handle, transport, and deliver material in the material container to the modular material delivery system throughout the fracturing process.

Material delivery system 100 is typically designed in modular components so that it can be transported using standard flatbed trailers and trucks. Modular components such as primary base module 110, secondary base module 120, and surge modules 130 typically have the container blocks or equivalent manufactured blocks designed into the framework on a 10-foot by 8-foot or a 12-foot by 8-foot spacing, as to match with the specially designed pin lock tool carrier on the RTCH. Usually, the designed spacing on the container blocks are such that each module can be handled, loaded on truck trailer, transported, unloaded, erected and dismantled with the use of the RTCH.

Empty material containers 200 can be loaded with material at the source or at a loading or transloading facility. Material containers 200 can be loaded as they rest on a truck trailer or railcar, or loaded and then transferred to the truck trailer or railcar for transport. After transport by rail, a RTCH at a rail siding can unload material containers 200 or transload material containers 200 to a truck trailer.

At the well site, an operator using the RTCH typically will initially remove any components of modular material delivery system 100 from the truck trailer or railcar used to transport them to the site. The operator typically will use the RTCH to attach the tool carrier by way of the lock pins into the container blocks on the components and lock the pins. The operator typically will then handle, transport and maneuver the components to a location for assembly. Components may be placed directly in their final usage location or temporarily stored in a staging area. Stackable components may be stacked until needed. By way of non-limiting example, full material containers 200 may be stacked up to three high in the staging area before the RTCH moves them atop surge modules 130. While material containers 200 are moveable while filled, surge modules 130 are not intended to be moved when filled.

The operator typically will then use the RTCH to attach the tool carrier by way of the lock pins into the container blocks on primary base module 110 and lock the pins. The operator typically will then handle, transport and maneuver primary base module 110 to the designated set-up position over the blender hopper. The operator typically will then release the lock pins and remove the tool carrier from the container blocks, leaving primary base module 110 over the blender hopper.

If secondary base module 120 is used, the operator using the RTCH will then typically attach the tool carrier by way of the lock pins into the container blocks on secondary base module 120 and lock the pins. The operator typically will then handle, transport and maneuver secondary base module 120 to the designated set-up position adjacent to primary base module 110. The operator can then release the lock pins and remove the tool carrier from the container blocks, leaving secondary base module 120 adjacent to the blender hopper.

The operator will generally then use the RTCH to attach the tool carrier by way of the lock pins into the container blocks of surge module 130 and lock the pins. The operator typically will handle, transport and maneuver one surge module 130 to the designated set-up position on top of primary base module 110 and secondary base module 120, if used. The operator usually will then release the lock pins and remove the tool carrier from the container blocks, leaving surge module 130 in place on top of primary base module 110. The operator can repeat this process until all surge modules 130 are in place.

In another aspect, the blender operator or equivalent can now proceed to finish final set-up by deploying base outriggers 113 (if used) and all transfer points, actuators, and electrical and/or hydraulic controls to control modular material delivery system 100. As a result, flow control of material through modular material delivery system 100 can be controlled by the blender operator using a control panel in the cabin of the blender.

The operator using the RTCH will then typically attach the tool carrier by way of the lock pins into the container blocks of material container 200 and lock the pins. The operator usually will handle, transport and maneuver material container 200 to the designated set-up position on top of one of surge modules 130. The operator will typically then release the lock pins and remove the tool carrier from the container blocks, leaving material container 200, with a capacity of 36,000 to 52,000 pounds of material, on top of surge module 130. This step may be repeated until modular material delivery system 100 includes either a complete complement of material containers 200 or the desired number of material containers 200.

The operator may repeat any step of this process as needed to complete the initial setup of modular material delivery system 100.

In another aspect, as the fracturing process starts and as the material containers 200 are emptied during the delivery process, the operator using the RTCH can continue to remove the empty material containers 200 and replace them with full material containers 200 until the fracturing process is finished. Once removed, empty material containers 200 may be stacked up to three high for storage in the staging area before the RTCH moves them to a truck trailer or railcar for removal. A typical flatbed truck trailer can accommodate up to three empty material containers 200; a typical railcar can accommodate up to four empty material containers 200.

It is to be understood that this written description uses examples to disclose the invention, including the best mode, and also to enable any person skilled in the art to make anew the invention. Any dimensions or other size descriptions are provided for purposes of illustration and are not intended to limit the scope of the claimed invention. Additional aspects can include slight variations, as well as greater variations in dimensions as required for use in the industry. The patentable scope of the invention may include other examples that occur to those skilled in the art.

It should be further understood that only major system components are labeled in every drawing. For clarity, not every part is labeled in every drawing. Lack of labeling should not be interpreted as a lack of disclosure.

What is claimed is:

1. A modular system for delivering material, comprising:
    a primary base module comprising a primary support frame, the primary support frame including an open frame space on a system front side, the open frame space at least partially surrounding a blender hopper;
    at least one surge module comprising a surge hopper supported by a surge frame wherein the surge hopper has a surge discharge gate for discharging material into the blender hopper, the at least one surge module having at least one container actuator for actuating a container gate actuator, the at least one surge module being supported by and removably coupled to the primary base module; and
    at least one material container comprising a container vessel supported by a container frame, wherein the container vessel has a container discharge gate for discharging material into the surge hopper, wherein the container gate actuator is mounted to the container frame, the at least one material container being supported by and removably coupled to the at least one surge module.

2. The system of claim 1, wherein the primary support frame comprises interconnected vertical, horizontal, and angled members and at least two container blocks, at least two frame load cell sockets, or any combination thereof placed at a spacing matching at least two bottom corners of the surge frame.

3. The system of claim 2, further comprising at least one cargo handler with a special tool carrier/container handler, the special tool carrier/container handler having a lock pin spacing matching a spacing between at least two container blocks in the primary support frame.

4. The system of claim 1, wherein the at least one surge module comprises two surge modules, wherein each surge module is located atop the primary base module, extending along the primary base module.

5. The system of claim 1, wherein the surge hopper comprises a descending tapering structure forming a surge delivery chute.

6. The system of claim 5, wherein the surge hopper tapers inwardly from a system back side and at least one of a system left side and a system right side.

7. The system of claim 1, wherein the surge hopper has a surge discharge gate for discharging material directly into the blender hopper.

8. The system of claim 7, wherein the surge discharge gate extends and moves horizontally within the surge frame.

9. The system of claim 7, wherein the surge discharge gate extends and moves vertically along an interior face of the surge frame.

10. The system of claim 1, wherein the container actuator is a linear actuator extending upwardly from the at least one surge module when activated.

11. The system of claim 1, further comprising at least one control box mounted to the surge frame, the at least one control box operably connected to the at least one container actuator.

12. The system of claim 1, further comprising at least one base outrigger rotatably or removably connected to a corner or side of the at least one primary base module.

13. The system of claim 1, further comprising at least one load cell removably mounted within a frame load cell socket in the primary support frame or within a surge load cell socket in the at least one surge frame.

14. The system of claim 13, wherein the at least one load cell comprises a half twist lock connected to a load cell transducer, wherein the load cell transducer is located between a load cell top plate and a load cell bottom plate.

15. A modular system for delivering material, comprising:
a primary base module comprising a primary support frame, the primary support frame including an open frame space on a system front side, the open frame space at least partially surrounding a blender hopper;
a secondary base module having a secondary support frame, wherein the secondary base module is removably coupled to the primary base module;
at least one surge module comprising a surge hopper supported by a surge frame wherein the surge hopper has a surge discharge gate for discharging material into the blender hopper, the at least one surge module having at least one container actuator for actuating a container gate actuator, the at least one surge module being supported by and removably coupled to the primary base module and the secondary base module; and
at least one material container comprising a container vessel supported by a container frame, wherein the container vessel has a container discharge gate for discharging material into the surge hopper, wherein the container gate actuator is mounted to the container frame, the at least one material container being supported by and removably coupled to the at least one surge module.

16. The system of claim 15, wherein the secondary support frame comprises interconnected vertical, horizontal, and angled members and at least two container blocks, at least two frame load cell sockets, or any combination thereof placed at a spacing matching at least two bottom corners of the surge frame.

17. The system of claim 16, further comprising at least one cargo handler with a special tool carrier/container handler, the special tool carrier/container handler having a lock pin spacing matching a spacing between at least two container blocks in the secondary support frame.

18. The system of claim 15, wherein the at least one surge module comprises three surge modules, wherein each surge module is located partially atop the primary base module and partially atop the secondary base module, extending from the primary base module to the secondary base module.

19. The system of claim 15, further comprising at least one catwalk module extending atop the primary base module and along the system front side in front of the at least one surge module.

20. The system of claim 19, further comprising at least one module ladder operably connected to the catwalk module and extending along a system right side or a system left side.

21. The system of claim 15, further comprising at least one load cell removably mounted within a frame load cell socket in the primary support frame or the secondary support frame, or within a surge load cell socket in the at least one surge frame.

22. The system of claim 15, further comprising at least one base outrigger rotatably or removably connected to a corner or side of the primary base module or the secondary base module.

* * * * *